United States Patent
Shah et al.

(10) Patent No.: US 9,330,003 B1
(45) Date of Patent: May 3, 2016

(54) INTELLIGENT ADAPTER FOR MAINTAINING CACHE COHERENCY

(71) Applicant: QLOGIC, Corporation, Aliso Viejo, CA (US)

(72) Inventors: Shishir Shah, Irvine, CA (US); Normin A. Emralino, Huntington Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 232 days.

(21) Appl. No.: 13/790,471

(22) Filed: Mar. 8, 2013

Related U.S. Application Data

(60) Provisional application No. 61/660,604, filed on Jun. 15, 2012, provisional application No. 61/697,680, filed on Sep. 6, 2012.

(51) Int. Cl.
*G06F 12/00* (2006.01)
*G06F 12/08* (2016.01)

(52) U.S. Cl.
CPC .................................. *G06F 12/0815* (2013.01)

(58) Field of Classification Search
None
See application file for complete search history.

(56) References Cited

U.S. PATENT DOCUMENTS

| | | | |
|---|---|---|---|
| 5,689,678 A | 11/1997 | Stallmo et al. | |
| 6,219,676 B1 | 4/2001 | Reiner | |
| 6,467,022 B1 | 10/2002 | Buckland et al. | |
| 6,484,229 B1 | 11/2002 | Ichikawa et al. | |
| 6,799,283 B1 | 9/2004 | Tamai et al. | |
| 6,922,754 B2 | 7/2005 | Liu et al. | |
| 7,013,336 B1 | 3/2006 | King | |
| 7,249,221 B2 | 7/2007 | Shimada | |
| 7,356,573 B2 | 4/2008 | Sharma et al. | |
| 7,506,124 B2 | 3/2009 | Sharma et al. | |
| 7,617,289 B2 | 11/2009 | Srinivasan et al. | |
| 7,631,155 B1 | 12/2009 | Bono et al. | |
| 7,873,619 B1 | 1/2011 | Faibish et al. | |
| 8,099,499 B2 | 1/2012 | Oeda | |
| 8,555,022 B1 | 10/2013 | Edwards et al. | |
| 8,589,550 B1 | 11/2013 | Faibish et al. | |
| 8,805,951 B1 | 8/2014 | Faibish et al. | |
| 9,009,444 B1 | 4/2015 | Derbeko et al. | |
| 9,172,586 B1 | 10/2015 | Shah et al. | |
| 2003/0135782 A1 | 7/2003 | Matsunami et al. | |
| 2003/0172149 A1 | 9/2003 | Edsall et al. | |
| 2005/0027798 A1* | 2/2005 | Chiou et al. | .................. 709/203 |
| 2005/0210314 A1 | 9/2005 | Iguchi | |
| 2006/0075190 A1 | 4/2006 | Higaki et al. | |

(Continued)

OTHER PUBLICATIONS

"Office Action from USPTO dated Dec. 24, 2014 for U.S. Appl. No. 13/790,395".

(Continued)

*Primary Examiner* — Baboucarr Faal
(74) *Attorney, Agent, or Firm* — Klein, O'Neill & Singh, LLP

(57) ABSTRACT

A system having a first computing device interfacing with a first adapter and a second computing device interfacing with a second adapter, where the first adapter and the second adapter operate within a cluster is provided. The first adapter processes an I/O request, when the first adapter is a cache owner of a logical entity presented to the first computing device, otherwise the request is sent to the second adapter by a storage protocol controller of the first adapter and the second adapter as the cache owner of the logical entity processes the request.

20 Claims, 20 Drawing Sheets

(56) References Cited

U.S. PATENT DOCUMENTS

| | | |
|---|---|---|
| 2006/0095709 A1 | 5/2006 | Achiwa |
| 2006/0218362 A1 | 9/2006 | McManis |
| 2007/0016681 A1 | 1/2007 | Suzuki et al. |
| 2007/0028073 A1 | 2/2007 | Takayama et al. |
| 2008/0071984 A1 | 3/2008 | Araki et al. |
| 2008/0270700 A1 | 10/2008 | Rao et al. |
| 2008/0270727 A1 | 10/2008 | Jacobson et al. |
| 2009/0055507 A1 | 2/2009 | Oeda |
| 2009/0210620 A1 | 8/2009 | Jibbe et al. |
| 2009/0265507 A1 | 10/2009 | Jibbe et al. |
| 2010/0281230 A1 | 11/2010 | Rabii et al. |
| 2011/0087833 A1 | 4/2011 | Jones |
| 2011/0191534 A1 | 8/2011 | Ash et al. |
| 2011/0197046 A1 | 8/2011 | Chiu et al. |
| 2011/0238672 A1 | 9/2011 | Agarwala et al. |
| 2011/0276746 A1 | 11/2011 | Pruthi et al. |
| 2012/0005668 A1 | 1/2012 | Serizawa et al. |
| 2012/0089786 A1 | 4/2012 | Pruthi |
| 2012/0102137 A1* | 4/2012 | Pruthi ............... G06F 12/0813 709/213 |
| 2012/0137059 A1 | 5/2012 | Yang et al. |
| 2012/0159053 A1 | 6/2012 | Kano et al. |
| 2012/0221729 A1 | 8/2012 | Hara et al. |
| 2012/0254504 A1 | 10/2012 | Syu et al. |
| 2012/0254509 A1 | 10/2012 | Cleveland et al. |
| 2012/0331222 A1 | 12/2012 | Jibbe et al. |
| 2013/0042048 A1 | 2/2013 | Kutergin et al. |
| 2013/0080715 A1 | 3/2013 | Mori et al. |
| 2013/0111474 A1 | 5/2013 | Agarwal et al. |
| 2013/0132673 A1 | 5/2013 | Saito et al. |
| 2013/0198457 A1 | 8/2013 | Kobayashi et al. |
| 2013/0238851 A1 | 9/2013 | Chang et al. |
| 2013/0282982 A1 | 10/2013 | Hayashi |
| 2013/0290571 A1 | 10/2013 | Rizzo et al. |
| 2013/0339600 A1 | 12/2013 | Shah |
| 2014/0122778 A1 | 5/2014 | O'Brien |
| 2014/0129521 A1 | 5/2014 | Marsden |
| 2014/0258533 A1 | 9/2014 | Antony |
| 2015/0058547 A1 | 2/2015 | Thatcher et al. |
| 2015/0134920 A1 | 5/2015 | Anderson et al. |

OTHER PUBLICATIONS

"Office Action from USPTO dated Feb. 20, 2015 for U.S. Appl. No. 13/790,894".

"Office Action from USPTO dated Mar. 3, 2015 for U.S. Appl. No. 13/790,800".

"Office Action from USPTO dated Mar. 11, 2015 for U.S. Appl. No. 13/790,846".

"Office Action from USPTO dated May 7, 2015 for U.S. Appl. No. 13/790,499".

"International Search Report on related PCT application (PCT/US2013/042918) from International Searching Authority (USPTO) dated Nov. 27, 2013".

"Written Opinion on related PCT application (PCT/US2013/042918) from International Searching Authority (USPTO) dated Nov. 27, 2013".

"International Preliminary Report on Patentability on related PCT application (PCT/US2013/042918) from International Bureau (WIPO) dated Dec. 16, 2014".

"QLogic 10000 Series QLogic FabricCache Adapter Data Sheet", (Nov. 2013).

"Notice of Allowance from USPTO dated Aug. 14, 2015 for U.S. Appl. No. 13/790,846".

"Final Office Action from USPTO dated Aug. 18, 2015 for U.S. Appl. No. 13/790,395".

"Final Office Action from USPTO dated Sep. 24, 2015 for U.S. Appl. No. 13/790,800".

"Final Office Action from USPTO dated Sep. 15, 2015 for U.S. Appl. No. 13/790,894".

"Final Office Action from USPTO dated Oct. 23, 2015 for U.S. Appl. No. 13/790,499".

"Notice of Allowance from USPTO dated Nov. 25, 2015 for U.S. Appl. No. 13/790,846".

Notice of Allowance from USPTO dated Sep. 23, 2015 for U.S. Appl. No. 14/088,082.

Office Action from USPTO dated Oct. 19, 2015 for U.S. Appl. No. 14/165,100.

Office Action from USPTO dated Dec. 21, 2015 for U.S. Appl. No. 14/302,706.

Notice of Allowance from USPTO dated Jan. 15, 2016 for U.S. Appl. No. 13/790,395.

Extended European Search Report from EPO dated Jan. 28, 2016 for EP Application No. 13803862.5.

Office Action from USPTO dated Feb. 26, 2016 for U.S. Appl. No. 13/790,499.

* cited by examiner

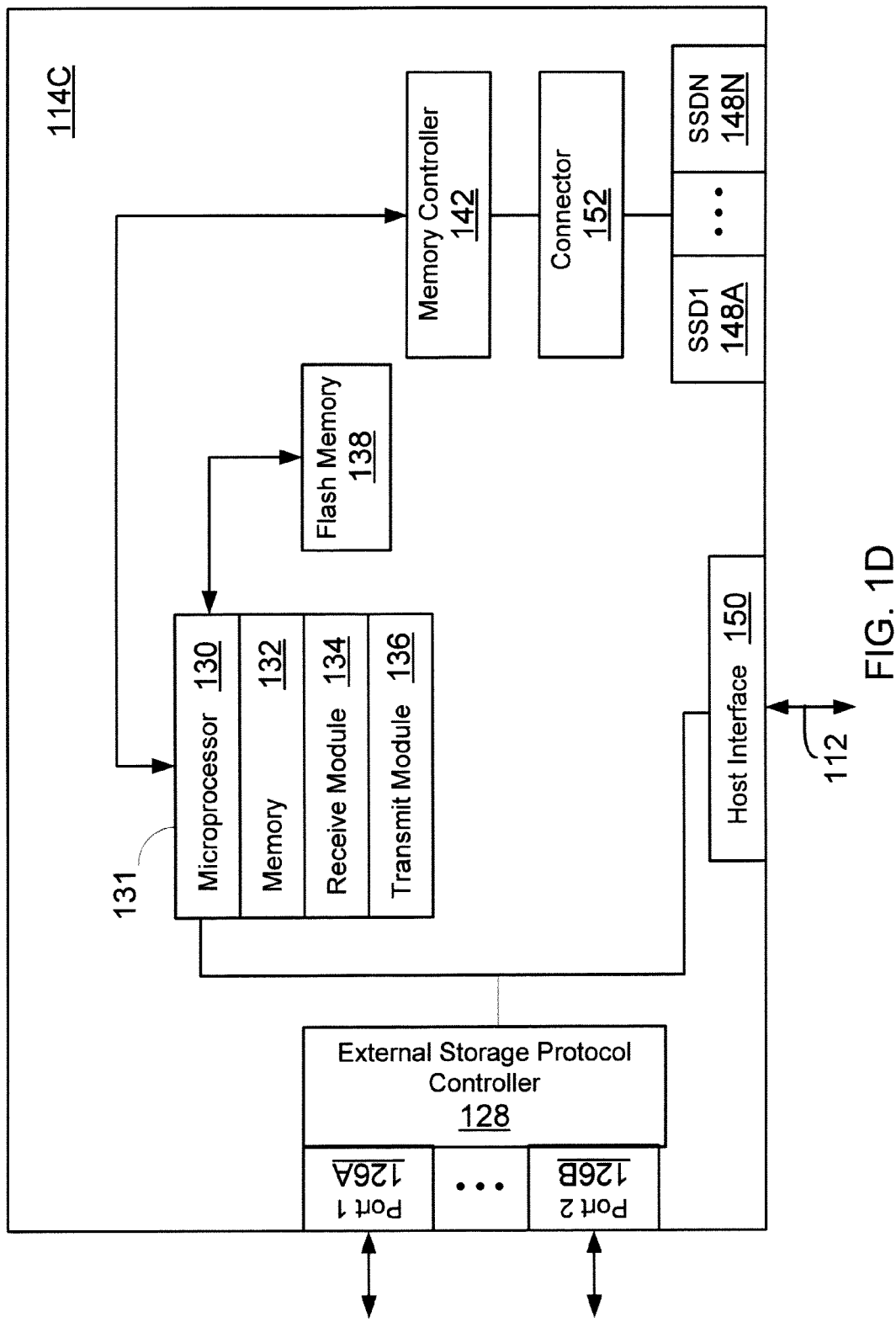

INTELLIGENT ADAPTER FOR MAINTAINING CACHE COHERENCY

CROSS REFERENCE TO RELATED APPLICATIONS

This patent application claims the benefit under 35 U.S.C. §119(e) of U.S. Provisional Application Ser. No. 61/660,604, filed on Jun. 15, 2012, and U.S. Provisional Application Ser. No. 61/697,680, filed on Sep. 6, 2012. The disclosures of the aforementioned provisional applications are incorporated herein in their entireties.

TECHNICAL FIELD

The present disclosure relates to network communications and devices.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use the mass storage devices to store data. Data centers are commonly used to store large amount of data for computing devices. Different storage options are available for computing devices to store data and retrieve data. For example, direct-attached storage (DAS), network attached storage (NAS) and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Continuous efforts are being made to better provide access to storage systems and improve how data is stored and retrieved in a network environment having a plurality of computing devices.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment, a machine implemented method is provided. A first adapter receives a request to write data at a storage location represented by a logical entity presented to an application executed by a first computing device. The first adapter includes a storage protocol controller for interfacing with a storage device accessible via a storage area network (SAN); and a processor for managing a first solid state storage device (SSD) whose storage space is configured to operate as a first cache logical unit number (LUN). The first adapter is a part of cluster having at least a second adapter with a second SSD whose storage space is configured to operate as a second cache LUN. The first adapter writes the data to the first cache LUN, when the first adapter is a cache owner of the logical entity, otherwise the request is sent to the second adapter that is the cache owner of the logical entity and then the second adapter processes the request to cache data at the second cache LUN.

In another embodiment, a machine implemented method is provided. The method includes a first adapter receiving a request to read data from a storage location represented by a logical entity presented to an application executed by a first computing device. The first adapter includes a storage protocol controller for interfacing with a storage device accessible via a SAN; and a processor for managing a first SSD whose storage space is configured to operate as a first cache LUN. The first adapter is a part of a cluster having at least a second adapter having a second SSD whose storage space is configured to operate as a second cache LUN. The first adapter reads the data from the first cache LUN, when the first adapter is a cache owner of the logical entity, otherwise the request is sent to the second adapter that is the cache owner of the logical entity and the second adapter obtains data in response to the request.

In yet another embodiment, a system having a first computing device interfacing with a first adapter and a second computing device interfacing with a second adapter, where the first adapter and the second adapter operate within a cluster is provided. The first adapter includes a storage protocol controller for interfacing with a storage device of a SAN via a port that provides SAN connectivity to the first adapter; a SSD managed by a memory controller and available to the first computing device as a local caching device; and a processor executing programmable instructions for processing an input/output (I/O) request received from the first computing device to read or write information to a logical entity presented to the first computing device. The first adapter processes the I/O request, when the first adapter is a cache owner of the logical entity, otherwise the request is sent to the second adapter by the storage protocol controller and the second adapter processes the request that is the cache owner of the logical entity and the second adapter processes the request.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts:

FIGS. 1B-1D show various embodiments of an intelligent storage adapter (ISA);

DETAILED DESCRIPTION

Figure 1A:
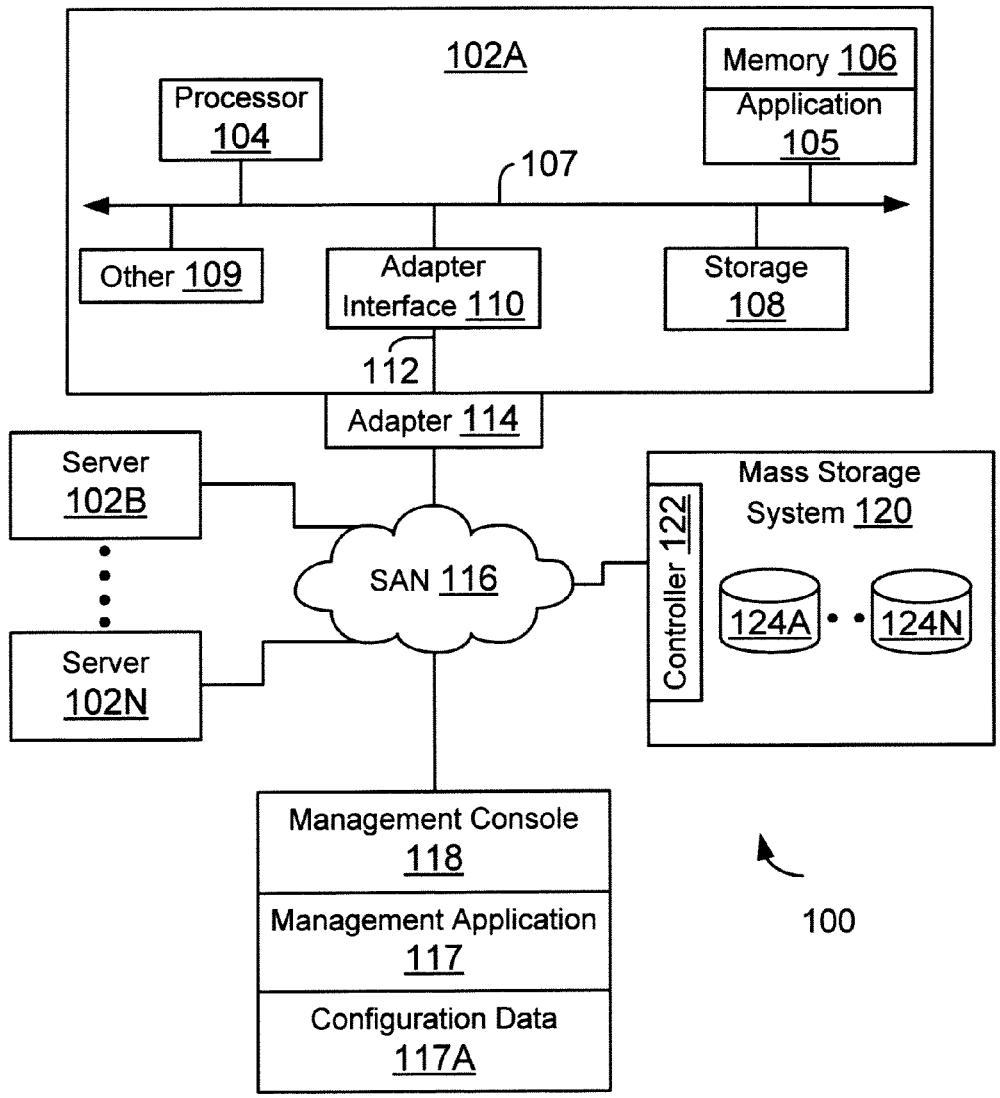
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry). manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program. firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

System 100:

FIG. 1A is a block diagram of a system 100 configured for use with the present embodiments. System 100 may include a plurality of computing systems 102A-102N (may also be referred to as server (s) 102 or host system 102), each coupled to an adapter 114 (also referred to as an intelligent storage adapter (ISA) 114) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108, which may be for example a hard disk, a CD-ROM, a non-volatile memory device (flash or memory stick) or any other storage device for storing structured or unstructured data. Storage 108 may store operating system program files (or data containers), application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a solid state storage device (may also be referred to herein as SSD 108). SSDs are becoming popular for servers that may need to store large amounts of data. ISA 114 described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105 for performing certain functions. For example, application 105 may be a database application, a virtual machine executed in a virtual environment (provided by VMWare Corporation, Microsoft Corporation or any other entity) electronic email application (for example, Microsoft Exchange) or any other application type. Application 105 may issue read and write requests that are processed by ISA 114, as described below in more detail The computing system 102A also includes other devices and interfaces 109, which may include a display device interface, a keyboard interface, a pointing device interface and others. The details of these components are not germane to the inventive embodiments.

ISA 114 may be configured to handle both network and storage traffic while interfacing with other elements. In one embodiment, as described below in detail, ISA 114 may be configured to provide the functionality of a host bus adapter (HBA) by providing connectivity to SAN (storage area network) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment. ISA 114 can be configured to operate as a FCOE adapter. Those of ordinary skill in the art will appreciate, however, that the present embodiments are not limited to any particular protocol.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114 may operate as an initiator as well as a target for responding to input/output (referred to as I/O or "IO") requests for reading and writing information at storage devices.

Storage space at a storage device (local or SAN-based) is typically presented to application 105 as a logical entity referred to as a logical unit number (LUN). Each LUN is uniquely identified by an identifier (LUN ID) and is associated with physical storage space. A LUN is typically divided into logical block addresses (LBAs) that are used by application 105 to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114 may be referred to as "cache" LUN. A cache LUN may be used to cache data stored at a SAN LUN or another data LUN. The cache LUN is managed by ISA 114 and may not be visible to application 105, as described below in more detail.

Referring back to FIG. 1A, computing system 102 uses an adapter interface 110 to communicate with ISA 114 via a link 112. In one embodiment, link 112 may be a PCI-Express link or any other interconnect type. The adaptive embodiments disclosed herein are not limited to any particular link type.

ISA 114 may communicate and interface with local storage 108 and a mass storage system 120 via a SAN 116 that may include one or more switch (may be referred to as fabric switch). The mass storage system 120 may include a plurality of storage devices 124A-124N. Storage space at storage devices 124A-124N may be presented as SAN LUNs to application 105 via SAN 116. Controller 122 of mass storage system 120 may be used to manage storage devices 124A-124N. In one embodiment, controller 122 may include a processor, an ISA 114 and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. A LUN is typically identified by a unique identifier; has a size associated with it that may indicate the amount of storage space that is made available to a computing system and a drive letter that may be used to access the LUN. Permissions associated with a LUN may also be configured using management application 117. The permissions indicate which entities may be allowed to access a LUN to read and/or write information. Management application 117 may store LUN attributes and permissions in a configuration data structure 117A at a storage location.

As mentioned above, computing system 102A may include SSD 108 such that mass storage devices are "closer" to computing system 102A. When SSDs are deployed in computing system 102A, they may be used for caching data that is closest to the applications executed within server 102A. This improves performance from the application's perspective because performance is not limited due to bandwidth limitations of SAN 116 or of controller 122 at the mass storage system 120.

One challenge of having SSDs in servers is synchronizing data between a SSD operating as a local cache and a remote SAN-based storage (124A-124N). For example, assume that a first server 1 has SSD1 and can use network storage i.e. a shared LUN. A second server 2 has SSD2 and can also access the shared LUN. When server 1 needs to read data from the shared LUN, it obtains the data and caches it at SSD1. Server 2 does the same at SSD2. This operates well for read operation, however if either server executes a write operation on the shared LUN, cache coherency between the shared LUN, SSD1 and SSD2 is lost and may result in data corruption. For example, server 1 may read data from SSD1, while server 2 may write data to the shared LUN. Thus server 1 may be reading invalid data from SSD1.

Another drawback of conventional systems is that separate drivers are typically used for SSDs and HBAs. Managing additional drivers, agents and applications increase complexity of overall software management within a host computing system and increases overall cost of operating the servers.

Another challenge with conventional systems providing SSDs to severs is sharing data stored at local SSDs between multiple servers that may be running a virtual machine environment (for example, virtual machines provided by VMWareInc, Microsoft Corporation and others) or application clusters. Virtual machines are typically presented on one or more computing systems and may execute different operating systems. The virtual machines are presented storage space as virtual hard drives (VHDs) that are in turn associated with LUNs and physical storage. When a virtual machine is either migrated or redeployed to another physical server, it can lose access to a cache provided at a local SSD. For example a VM1 running on a physical server 102A has stored its cache data on a local SSD 108 residing on a server 102A. When VM1 is migrated from server 102A to server 102B, VM1 has no longer access to its cache storage on SSDs 108 on server 102A.

In one embodiment, ISA 114 is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114 may configure a LUN from the local storage 108 and present the LUN to servers 102A-102N, allowing the local storage 108 to be shared by other Servers 102B-102N.

In another embodiment, ISA 114 provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

In one embodiment, data may be written at an SSD and SAN storage at the same time. This may be referred to as "Write Through." In another embodiment, data is first written to a SSD and a confirmation is sent to the computing system. Data is then written to a SAN storage at a later time. This may be referred to as "Write Back." When data is written using the "Write Back" method in response to a write command, as described below in detail, data may also be mirrored across two ISAs 114 located at computing system 102A and any other computing system 102B-102N before a confirmation is sent to a computing device that initiated the write command. Both the Write Back and Write Through processes are described below in detail.

In another embodiment, multiple ISAs 114 connected via SAN 116 may operate in a group (or a cluster) that may be identified by a unique cluster key. The cluster key may be assigned and maintained by management application 117 at a configuration data structure 117A. The cluster key is provided to the ISAs so that they can access storage within the data pool created by aggregating storage across members of the group and form a common cache pool for the cluster members.

Figure 1B:
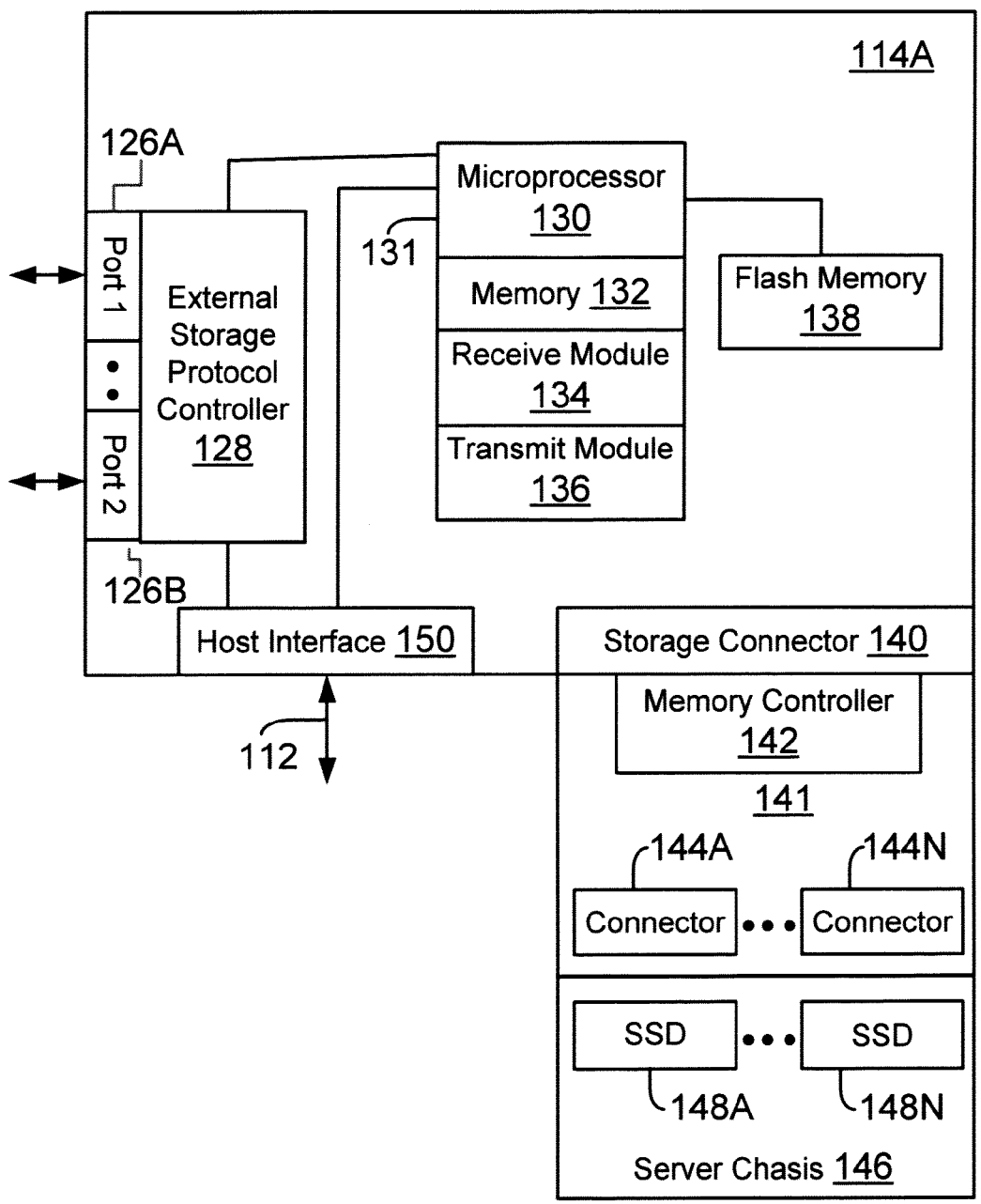
Figure 1C:
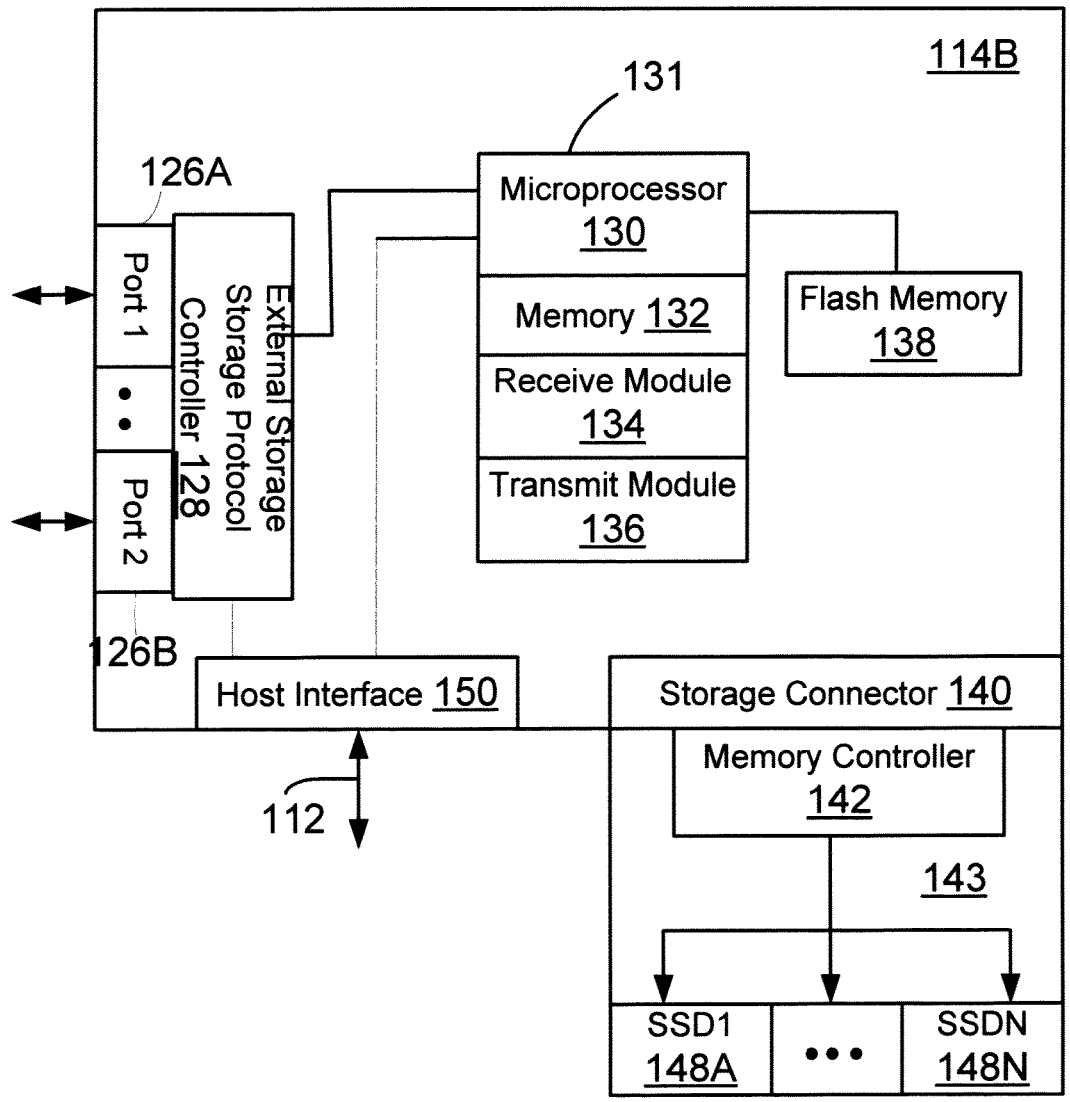

FIGS. 1B-1D show various embodiments of ISA 114 as 114A-114C having certain common components that have only been described in FIG. 1B. As shown in FIG. 1B, ISA 114A includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC3. FC0 is defined by the Fibre Channel specification as the physical layer, which includes cables (fiber optics, twisted-pair), connectors and others. FC1 layer is defined as the data link layer. This layer implements the 8B/10B encoding and decoding of signals. FC2 layer 49C is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a micro-processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by micro-processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors 144A-144N. The plurality of connectors 144A-144N are used to plug in SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors.

ISA 114A has SAN connectivity because of ports 126A-126B, similar to a host bus adapter, as mentioned above. The storage protocol controller 128 allows SAN storage based processing. Unlike conventional HBAs, ISA 114A also includes a storage connector 140 that provides local storage solutions via SSDs 148A-148N. Furthermore, unlike conventional caching solutions, where host systems use separate drivers for SSDs and HBAs, the architecture of the present embodiments (See FIG. 1F) simply uses a unified driver for both HBA functionality and for using the SSDs 148A-148N.

FIG. 1C shows another embodiment of ISA 114B where a daughter card 143 has the SSDs 148A-148N on the card itself, rather than on the server chassis 146, as shown in FIG. 1B, according to one embodiment. FIG. 1D shows another embodiment of ISA 114C where the memory controller 142 is on the same card as the other components of ISA 114C. The SSDs 148A-148N are also on the same card connected via one or more storage connectors 152.

Figure 1E:
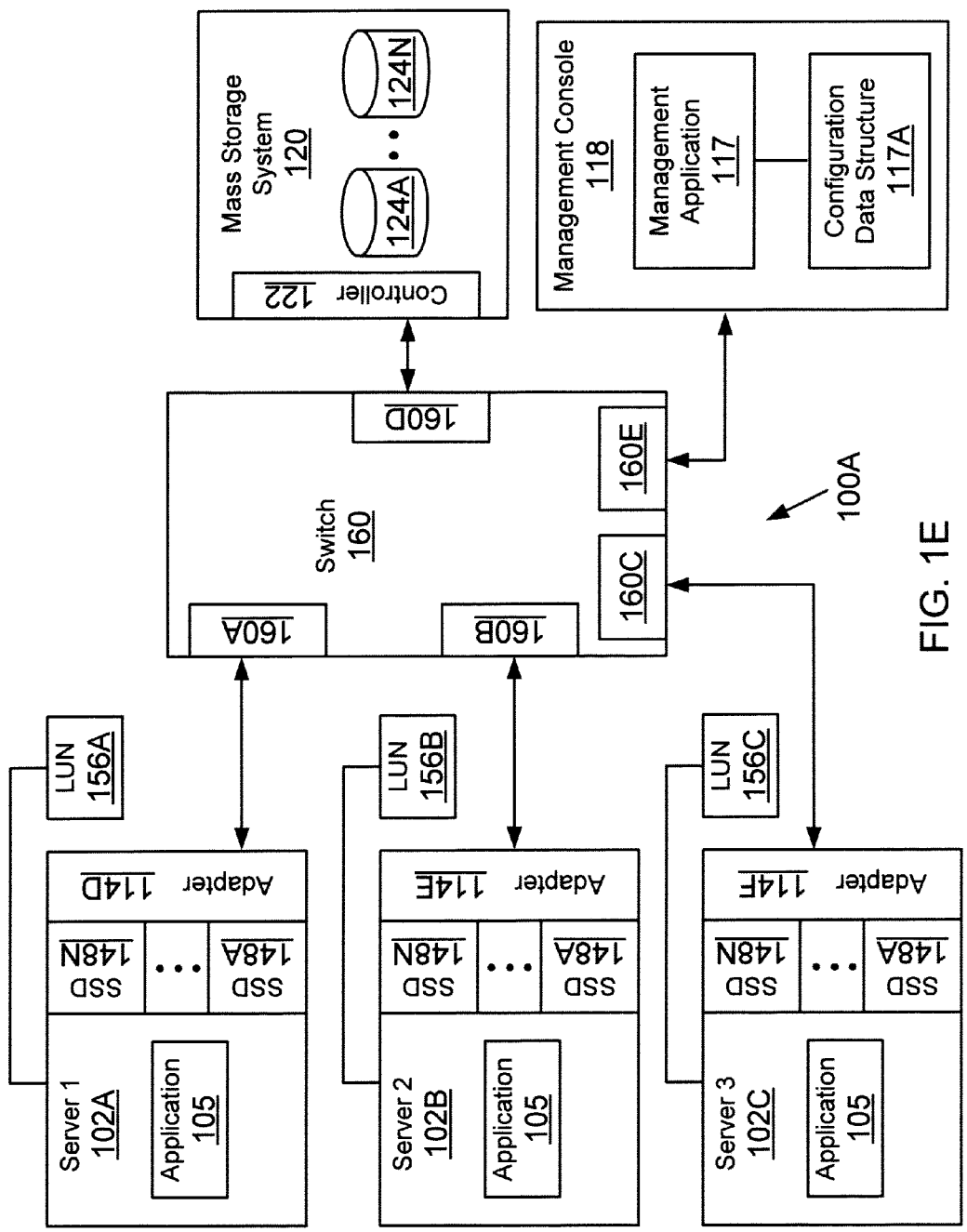
FIG. 1E shows an example of a configuration for using the ISAs, according to one embodiment.

FIG. 1E shows a system 100A where each ISA 114D-114F (similar to ISA 114 described above) in servers 102A-102N are coupled to a fabric switch 160, according to one embodiment. Fabric switch 160 includes a plurality of ports 160A-160E. Ports 160A-160C are coupled to ISA 114D-114F ports, respectively, while port 160D is coupled to controller 122 of the mass storage system 120. Management console 118 may be coupled to port 160E for configuring various components of system 100A.

Management console 118 may also be used to configure LUNs 156A-156N that are presented to servers 102A-102N for storing information. The LUNs may be based on storage located at SAN-based storage 120 or at a local SSD 148A-148N.

The LUNs 156A-156N may be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs. LUNs 156A-156N may also be configured as a SAN mirror LUN. In such configuration, the LUN is a mirror of a LUN that is associated with a SAN-based storage device. LUNs 156A-156N may also be configured as Peer Mirror LUN. In such a configuration, the LUN is mirrored across at least two ISAs and hence can be made accessible to at least two servers.

The LUNs 156A-156C may also be accessible by one or more servers via SAN 116. In this example, a DAS (direct attached storage) based SSD becomes accessible as SAN storage, while the DAS based storage is still managed by an application 105 (for example, a database application).

In FIG. 1E, in one embodiment ISA 114D in server 102A acts as a storage protocol controller for LUN 156A, serving up LUN 156A to initiators ISA 114E in server 102B and ISA 114F in server 102C. At the same time, ISA 114D also acts as a traditional HBA (initiator) for SAN LUNs at SAN storage devices 124A-124N.

In one embodiment, an efficient software architecture is provided for using the ISAs described above. An example of software architecture (or system) 161 for systems 100/100A is shown in FIG. 1F and described below in detail.

Figure 1F:
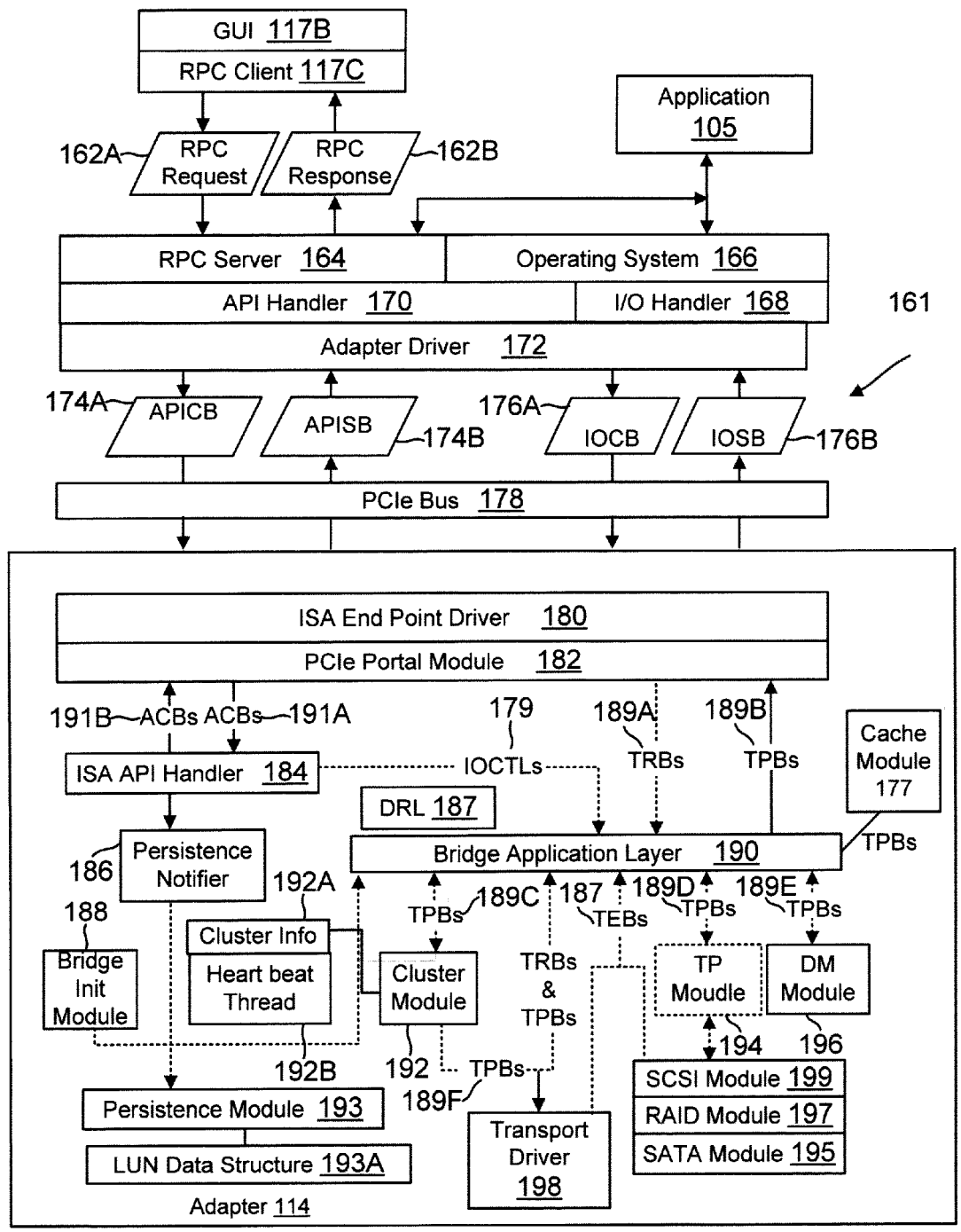
FIG. 1F is a block diagram of the overall architecture for the ISAs, according to one embodiment.

FIG. 1F shows a block diagram of a system 161 for using ISA 114, according to one embodiment. Components of system 161 are executed by processor 104 or by ISA 114. System 161 includes a graphical user interface (GUI) 117B that may be provided by or at management console 118, either as part of management application 117 or to management application 117. GUI 117B may be used by an administrator to configure and monitor one or more ISAs 114.

GUI 117B interfaces with a remote procedure call (RPC) client 117C. RPC is an inter-process communication mechanism that is used by a client and a server to communicate. Details regarding RPC mechanism are not germane to the embodiments disclosed herein.

RPC client 117C communicates with a RPC server 164 using a request and response mode. A RPC request 162A is sent to the RPC server 164 and a response 162B is received by the RPC client 117C. The RPC server 164 may be executed by processor 104 of host computing system 102A that sends out I/O requests to read and write information.

Processor 104 or a similar device also executes operating system 166 for controlling the overall operations of host system 102A. The operating system 166 may be Windows-based, Linux-based, Solaris-based, Unix-based or any other operating system type. Processor 104 or a similar device also executes an application programming handler (API handler) 170, an I/O handler 168 and an adapter driver 172 that are described below in detail.

System 161 components use various commands and data structures for processing read and write commands, as well as management commands. The commands/structures include TRBs (target request blocks), TPBs (target process blocks), TEBs (target event blocks) and ACBs (application control blocks) that are described below in detail.

A TRB is a data structure used for managing an I/O request received from a host system 102A, a FC initiator via an FC port (for example, a port from among 126A-126B) or an iSCSI initiator via an Ethernet port (for example, a port from among 126A-126B). The term initiator as used herein means an ISA coupled to a host system. In one embodiment, one TRB may be associated with an IOCB (input/output control block) that is used to initiate an I/O operation. A TRB includes information from a host system or a Network initiator (for example, a FC/iSCSI/FCoE initiator) to execute an I/O request. The information includes a CDB information regarding a target device, LUN identifier information, any buffer addresses, request context information and any other information. The TRB may also include reference to the TPBs defined below.

A TPB is a structure used to move data between various ISA 114 components to complete an I/O request. One or more TPBs are associated with a TRB and may be used to identify data buffers (not shown) that are associated with the I/O request. As described below in detail, TPBs are passed through various interfaces to transfer data using direct memory access (DMA) operations.

A TEB is a structure that is used to send notification from an ISA 114 interface/component to a central processor executable layer, shown as a bridge application module (may also be referred to as layer) 190. For example, if a Fibre Channel link has gone down, then a FC layer sends a TEB to a bridge application module 190 described below.

An ACB is a structure that is based on an API control block for obtaining status, exchanging parameters, obtaining or providing configuration information. The use of ACBs are also described below in detail.

In one embodiment, ISA 114 executes a driver 180 (shown as endpoint driver 180) for communicating with adapter driver 172 executed by the host system 102A. In one embodiment, the endpoint driver 180 may be executed by processor 130. The adapter driver 172 may be an integrated driver module that can be used to use HBA functionality of ISA 114 as well as for interfacing with SSDs 148A-148N. Separate SSD and HBA drivers are not needed in system 161. This reduces complexity for communicating with SAN-based storage and local SSDs.

The endpoint driver 180 may implement a plurality of registers for communicating with adapter driver 172. The endpoint driver 180 also communicates with a PCIe (i.e. PCI-Express) portal module (or layer) 182 executed by the ISA 114. The PCIe portal module 182 may be used to send and receive TRBs 189A/189B and ACBs 191A and 191B, also shown in FIG. 1F.

API control block (APICB) command 174A is based on client requests generated by client application 105. The client requests may seek status information or set certain parameters at ISA 114. The client requests are received by API handler 170 that generates APICB 174A. The APICB 174A is then passed to the endpoint driver 180 by adapter driver 172. In another embodiment, the adapter driver 172 may generate the APICB 174A.

The endpoint driver 180 generates an ACB 191A and provides the ACB 191A to the ISA API handler 184 via the PCIe portal module 182. In another embodiment, the ACB 191A may be generated by the PCIe portal module 182. In another embodiment, an ACB may be received from another ISA via one of a FC/iSCSI/FCoE network using the SCSI protocol.

ISA API handler 184 is a logical layer executed by processor 130. The ACBs received by the ISA API handler 184 are transformed into TEBs and then queued by ISA API handler 184 at a memory location (not shown). ISA API handler 184 then either issues control commands (IOCTLs) 179 to the bridge application module 190 to complete the TEBs or calls into a persistence notifier module (or layer) 186 to obtain or send parameters to a persistence module 193.

The persistence module 193 is used to manage a non-volatile memory accessible to ISA 114, for example, 138. The non-volatile memory 138 may be used to store various data structures used by ISA 114, as described below.

In one embodiment, adapter driver 172 receives an I/O request from application 105 to read or write information from or to a storage device. Based on the I/O request, adapter driver 172 (or I/O handler 168) generates an IOCB that provides information regarding how data is to be read and written and the logical location for reading or writing information. The IOCB is provided to I/O handler 168 at the host system 102A. The I/O handler 168 sends the IOCB 176A to adapter 114 via a DMA operation. A TRB 181 based on the IOCB 176A is also sent to the bridge application module 190 using a DMA operation. The bridge application module 190 then generates various TPBs (shown as 189B-189F) associated with the TRB and spawns the TPBs to different modules, as appropriate. As TPBs are completed the bridge application module 190 queues the TPBs for the PCIe portal module 182. Once all the TPBS for a TRB are completed, then a status control block (IOSB) 176B is provided to adapter driver 172.

In one embodiment, the bridge application module 190 is a central processor executable layer for ISA 114 that is executed by processor 130. The bridge application module 190 processes I/O requests (i.e. TRBs), spawns (or distributes) TPBs for a TRB and routes TPB to an appropriate interface. The bridge application module 190 can pull information to and from the persistence module 193. Furthermore, the bridge application module 190 also implements a plurality of IOCTLs that can be called by ISA API handler 184 or RPC server 164.

System 161 also includes a thin provisioning (TP) module (may also be referred to as TP layer) 194 that interfaces with the bridge application module 190 for receiving TPBs. The TP module 194 is used for managing data storage at local SSDs 148A-148N, as well as interacting with a data migration (DM) module (may also be referred to as DM layer) 196. The DM module 196 is used for synchronizing data storage with a remote location as described below in detail.

The TP module 194 receives TPBs from the bridge application module 190 and determines if the TPBs are for a "parent" LUN or a local LUN (i.e. at a local SSD). If the TPB is for a local LUN, then it is forwarded to a SCSI module (or layer) 199 that forwards the request to a RAID (redundant array of independent disks) module (or layer) 197 for reading and writing data to SSDs 148A-148N. The terms local and parent LUNs are described below with respect to FIG. 3. In one embodiment, the SCSI module 199 is a low level, storage module executed by processor 130 and accepts TPBs from TP module 194 for reading and writing data to the SSDs 148A-148N (FIG. 1B). The RAID module 197 may also be executed by processor 130.

The RAID module 197 also interfaces with a storage driver 195 shown as SATA Module 195. The SATA driver 195 is used for managing and interfacing with SATA controllers (for example, memory controller 142). The SATA driver 195 interfaces with the memory controller of the SSDs for reading and writing data. The SATA driver 195 also implements various IOCTLs that are used by the bridge application module 190 for exchanging parameters. The embodiments described herein are not limited to SATA drivers and any other storage driver depending on the storage interface may be used to implement the adaptive embodiments. In one embodiment, the SCSI module 199, the RAID module 197 and the SATA driver 195 are not provided in conventional HBAs because unlike ISA 114 conventional HBAs do not provide access to local SSDs.

If a TPB received by the TP module 194 is for a parent LUN then it is forwarded to the DM module 196. The DM module 196 clones the TPB and generates a TPB for a remote LUN, when the TPB is for a write operation. The DM module 196 also creates an entry for a dirty region log (DRL) 187. A link or reference to the DRL 187 is added to the cloned TPB. The cloned TPBs are queued to the bridge application module 190 for routing to a cluster module (or layer) 192 that is described below in detail. The DM module 190 may also be used to transform the TPB for the parent LUN into a TPB for a local LUN. In that case, the TPB is queued for the bridge application module 190 so that it can be sent to the TP module 194.

The DRL 187 is a data structure that is used to track changes to storage blocks at a first storage location, after storage blocks have been migrated from the first storage location to a second storage location. For example, assume that information stored at storage blocks B1-B5 is being migrated from a first storage location to a second storage location. Each storage location may have its own ISA 114 for managing I/O requests. While the data is being migrated, a request to write to block B1 is received by the ISA 114 that is interfacing with a hot system. The ISA 114 creates an entry for block B1 to indicate that it has been changed such that after the migration, the information at block B1 is updated and then migrated to the second storage location.

In one embodiment, system 161 also includes a cache module (may also be referred to as cache layer) 177 that is used to manage a cache for SAN LUNs based on storage space at storage devices 124A-124N. SAN LUNs maybe configured to use a cache at local storage 148A-148N as Read only, Read Write Through or Read Write Back. The cache module 177 receives TPBs from the Bridge application module 190. In the case of a read request, if the cache module 177 determines that the requested data is available in a local cache, it will retrieve the data from the cache either from ISA memory or from local SSDs using the SCSI module (or SCSI transport) 199 and complete the request by transferring data back to either the requesting host system or another ISA 114 depending on where the request was originated.

If the cache module 177 determines that there is partial data in the cache or no data at the local cache it will request data from the SAN LUN using a transport driver 198. In one embodiment, transport driver 198 may be a FC driver, when FC is used as the protocol for communicating with FC based storage devices for reading and writing data. The term FC driver and transport driver are used interchangeably throughout this specification. The FC driver 198 is executed by processor 130 and implements IOCTLs that are used by bridge application module 190 for getting and sending parameters to storage protocol controller 128. The FC driver 198 may also receive TPBs from cluster module 192 for reading and writing data, as described below. It may decide to pre-fetch more data from the SAN LUN based on caching parameters established when the cache was configured for the SAN LUN. The FC driver 198 interfaces with the storage protocol controller 128 to access SAN-based storage and to communicate with other ISAs. In conventional adapters, a module like the FC driver 198 is not implemented because that functionality is typically provided at the host computing system level i.e. the FC driver is executed at the host system instead.

In one embodiment, the cluster communication module (or layer) 192 communicates with the bridge application module 190 for sending and receiving TPBs between ISAs 114 within a cluster. In one embodiment, a cluster has at least two ISAs 114. The cluster module 192 creates a vendor unique CDB (VU CDB) to communicate an original CDB and DRL 187 information for a peer ISA 114, as described below in detail.

System 161 includes an initialization module (or layer) 188. This module is used to start ISA 114 modules by loading various ISA 114 drivers and starts various threads.

Figure 2A:
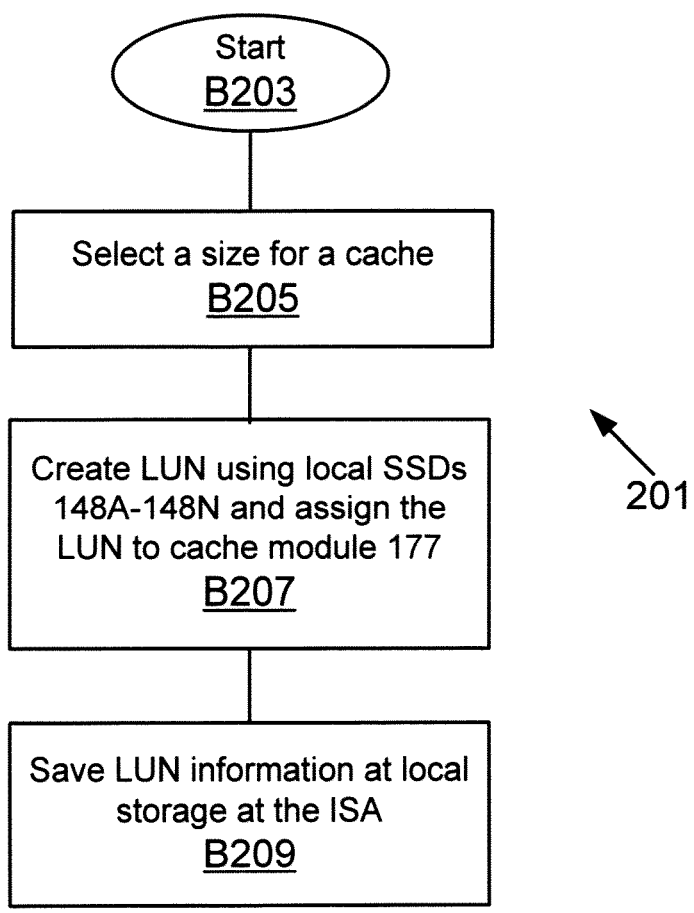
FIGS. 2A-2G show process flow diagrams of various embodiments of the present disclosure.

FIG. 2A shows a process 201 for configuring a cache size for a local cache LUN based on storage space at SSDs 148A-148N, according to one embodiment. The cache LUN can be configured to cache information that is stored at a SAN LUN or to mirror data that is stored at another LUN managed by another ISA, as described below in detail. The cache LUN may be configured such that it is not visible to a host computing system and instead is managed by the caching module 177.

The process begins in block B203, when an ISA (for example, 114D (FIG. 1E)) and the local SSDs 148A-148N are operational. The process may be performed at the management console 118 using management application 117. In block B203, a user interface, for example, a graphical user interface or a command line interface is displayed at a display device for configuring the local cache LUN. In block B205, using management application 117, a size for the cache LUN is selected. In block B207, ISA 114A creates the cache LUN based on storage space that may be available at SSDs 148A-148N. The LUN is assigned to the caching module 177 that has been described above.

In block B209, cache LUN information is saved at a location accessible to the ISA 114 using the persistence module 193. In one embodiment, the LUN information may be stored as a data structure 193A at a local SSD, local non-volatile memory 138 or any other location. In one embodiment, the LUN information data structure 193A may be used to specify LUN parameters, i.e. whether the LUN is a read cache, a write cache, a mirror cache or a read/write cache. A read cache is used only for reading data, the write cache is used for writing data and the read-write cache can be used for both. The mirror cache is used to cache data stored at another LUN (for example, another cache LUN managed by a peer ISA). The data structure may also store a LUN address, information regarding the device type from which the LUN is created on, LUN size (for example, in logical address blocks (LBAs), LUN identifier to identify the LUN and any operations that can be performed on the LUN for example, "getting LUN status, updating LUN parameters and others.

Figure 2B:
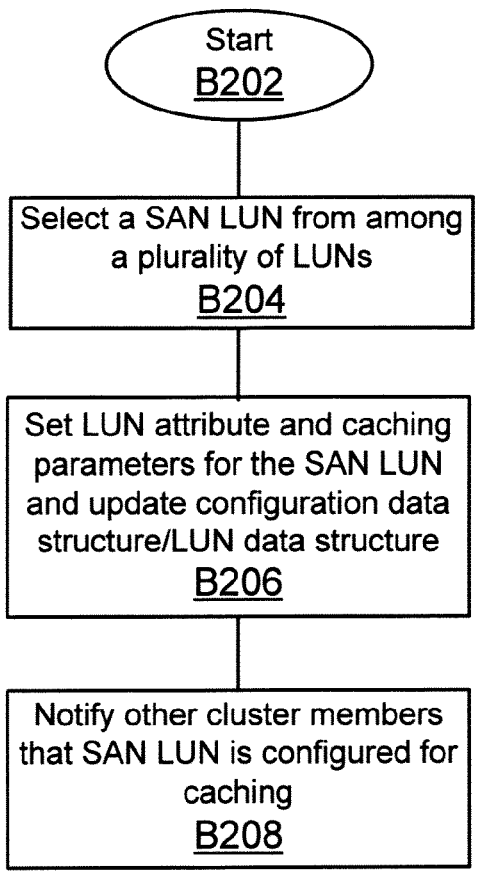

FIG. 2B shows a process flow 200 for configuring a SAN LUN based on storage space at storage devices 124A-124N that are accessible via a SAN, according to one embodiment. The process starts in block B202 when management console 118 is initialized and operational. One or more of ISAs 114D-11F (FIG. 1E) is also operational. A graphical user interface (GUI) or a command line interface (CLI) is presented on a display device (not shown) by the management console 118. In one embodiment, the display device may be integrated with management console 118 or operate as a separate device. The management application 117 maintains data structures (for example, as part of configuration data structure 117A) for storing information regarding SAN LUNs. The LUN information may be similar to the LUN information that is stored in data structure 193A, described above.

In block B204, management application 117 presents a list of LUNs to the user and the user may select a SAN LUN from among the among the plurality of SAN LUNs based on storage space at storage devices 124A-124N. The LUN may be configured to operate as a boot LUN; SAN mirror LUN or any other LUN type.

In block B206, LUN attributes and caching parameters are assigned to the LUN. The caching parameters are to enable a read cache, a write cache or a read/write cache for the SAN LUN. The cache for the SAN LUN in this context is a cache LUN that is configured based on storage space at SSDs 148A-148N described above. The caching parameters are also stored at a memory storage location at the ISA, for example, memory 138 or at SSDs 148A-148N. The caching parameters may also be a part of LUN information data structure 193A. The LUN attributes information (for example, LUN identifier, size, permissions, identity of the LUN owner and any other information) is also saved by the ISA at a local storage location. In block B208, the SAN LUN configuration information is shared with other ISAs that are members of a cluster. Details regarding creating a cluster and cluster management are provided below. In one embodiment, by configuring and setting the caching parameters, local SSDs managed by ISAs can be used to cache information stored at SAN LUNs, as described below in detail.

Figure 2C:
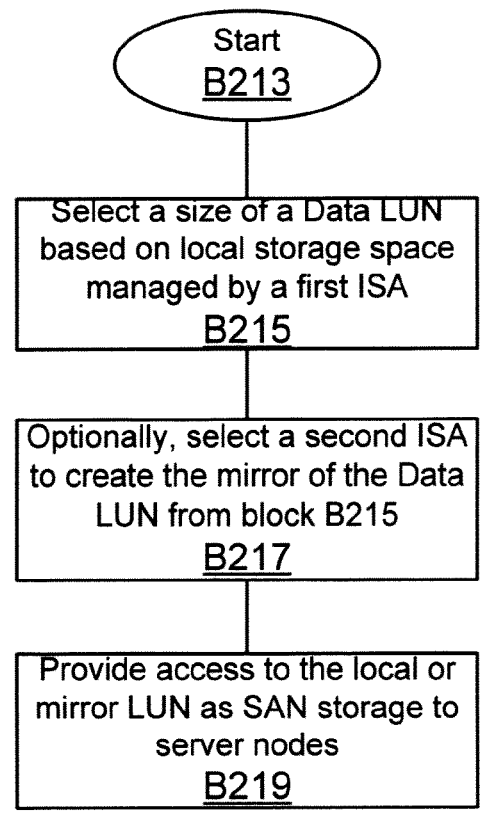

FIG. 2C shows a process 211 for provisioning a data LUN based on storage space at local SSDs 148A-148N. The data LUNs are used for storing information based on I/O requests and may be a local LUN for a computing system interfacing with an ISA (for example, 102A and ISA 114A) or presented as a SAN LUN that other host computing system can access and use. Thus, local SSDs 148A-148N connected across multiple ISAs can be used as a single pool of storage, according to one embodiment.

Process 211 starts in block B213 when management console 118 is initialized and operational. One or more of ISAs 114D-114F (FIG. 1E) is also operational. A graphical user interface (GUI) or a command line interface (CLI) is presented on a display device (not shown) by the management console 118.

In block B215, a data LUN is created using storage space at local SSDs 148A-148N. A size is assigned to the data LUN. In block B217, optionally, a second ISA within a cluster is selected to create a mirror of the data LUN created in block B215. An example of mirror LUNs 301A and 301B is shown in FIG. 3 that is described below in detail. In block B219, the data LUN created from the local SSDs 148A-148N can be presented as SAN storage to various server nodes or just as local storage to the computing system that is coupled to the ISA. Information regarding the data LUN is stored at LUN information data structure 193A. In one embodiment, when configured for SAN storage, the data LUN allows multiple applications/computing systems to share a SSD. Details regarding block B219 are provided below with respect to FIG. 2F.

Figure 2D:
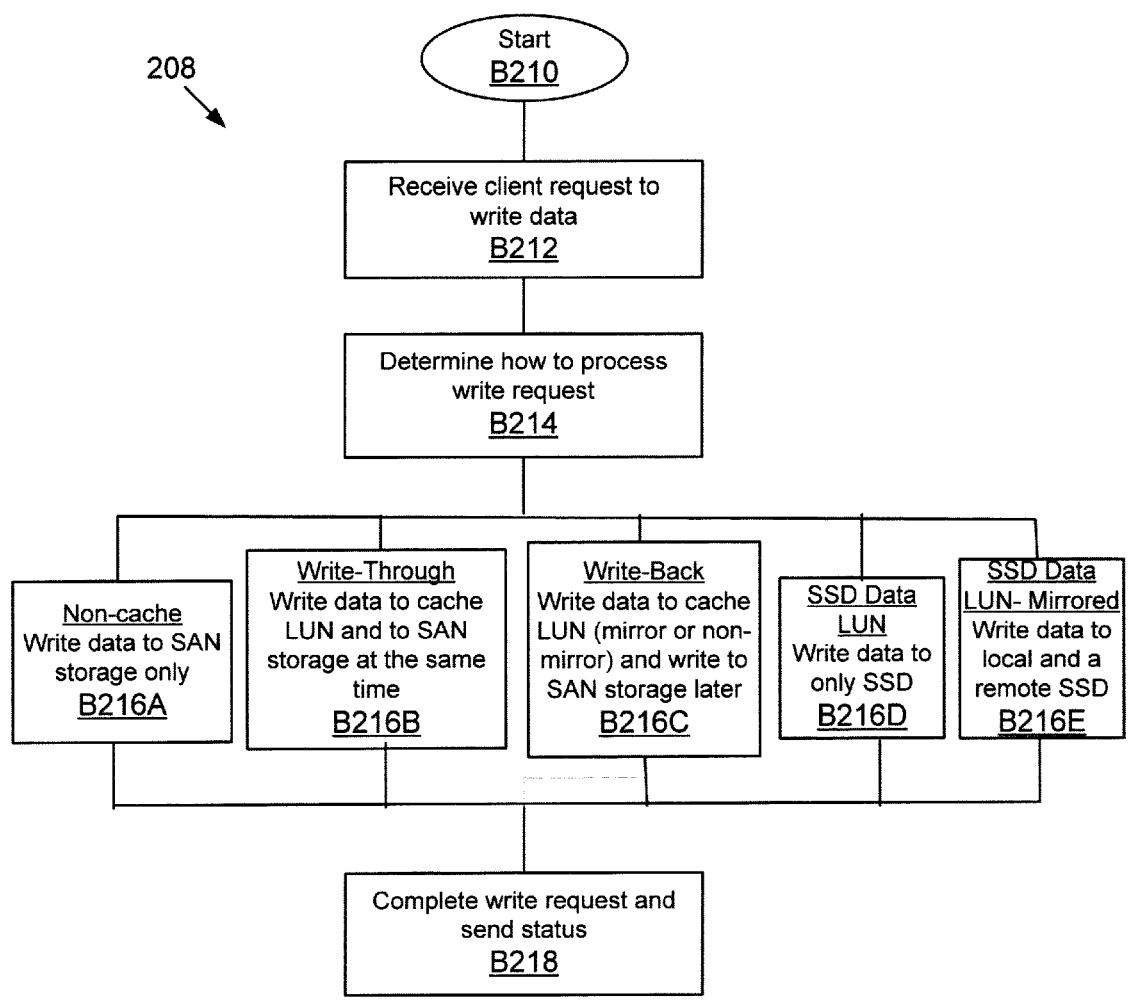

FIG. 2D shows a process 208 for handling write I/O requests using ISA 114, according to one embodiment. The process starts in block B210 when a computing system executing application 105 is operational with ISA 114. In block B212, a client request 212 is received to write data. The client request may be generated by application 105 executed by a processor. The client request is provided to the I/O handler 168 that generates IOCB 176A for the write request. The IOCB is provided to adapter driver 172 and then forwarded to endpoint driver 180. The client write request may also be received from another ISA using FC Driver 198. A TRB associated with the write request is generated and provided to the bridge application module 190.

In block B214, the bridge application module 190 determines how to write data. The various write options will depend on how the LUN/SSD storage affected by the write operation has been configured. Bridge application module 190 may use one or more data structures to determine how the write operation may be executed. For example, LUN information data structure 193A may be used to determine how a LUN addressed in the write request has been configured. The various LUN configurations have been described above. The various options for writing data are shown as 216A-216E, according to one embodiment and are described below.

In block B216A, data is only written at a SAN-based storage, for example, 124A-124N. This will depend on the configuration settings for a specific SAN LUN and/or server nodes i.e. when a LUN is configured simply as a SAN LUN then data is not cached. ISA 114 determines this by accessing LUN configuration information, for example, LUN information data structure 193A. To write data to SAN storage, the bridge application module 190 generates TPBs for the TRB and provides the TPBs to FC driver 198. The FC driver 198 then communicates with storage protocol controller 128 to send a write request via ports 126A-126B. In this configuration, ISA 114 provides host bus adapter functionality.

In block B216B, data is written at an SSD (148A-148N) and also mirrored immediately at a SAN-based storage 124A-124N and/or another cache LUN. As mentioned above, this method is referred to as "Write Through" caching. For this option, bridge application module 190 provides the TPBs to TP module 194 and the cluster module 177. The TP module 194 manages the write operation to a cache LUN created from one or more of SSDs 148A-148N, while the cache module 177 also interfaces with the FC driver 198 such that data can be mirrored at SAN storage (and/or another cache LUN) at the same time. In one embodiment, cache data structures are maintained by ISA 114 to track completion of write requests. The cache data structures are updated to reflect that data is present at the local cache, once the write operation is successfully completed. A completion to the write request is posted after data has been written to both the local cache and the SAN-based storage. If the write request fails to write to the SAN LUN, then the IO request is marked as failed and a status is returned to the requestor that may either be a local adapter driver 172 or another ISA in a different host system through FC (transport driver) 198. If the write operation was successful to write to the SAN LUN but failed at cache module 177, then the IO status may still be marked as successful, while the data related to the I/O request is marked as invalid for the local cache segment.

In block B216C, data is written to an SSD accessible via ISA and then mirrored at SAN-based storage at a later time. This write operation as mentioned above may be referred to as "Write Back." A "Write Back" cache LUN can be configured as a non-mirror or mirror LUN. In case of a mirror cache LUN, write data resides in a local SSD and also at another SSD of a peer ISA within a cluster. For the Write Back option, the bridge application module 190 provides the TPBs to the cache module 177. The cache module 177 manages this write operation using TP module 194 at one or more of SSDs 148A-148N. In case of a mirror Write Back cache, cache module 177 will also send data to the peer ISA using the FC driver 198 such that data can be mirrored on another ISA at the same time. The DRL 187 is used to track the mirroring operation. Entries at DRL 187 are updated such that any changes to blocks at SSDs can be mirrored at SAN storage 124A-124N (and/or peer mirror LUN at another ISA). Using DRL 187, cache module 177 may send data to the SAN storage using FC driver (transport driver) 198 at a later time.

In block B216D, data is only written to a SSD data LUN created from local SSDs 148A-148N described above. For this option, the bridge application module 190 provides the TPBs to TP module 194. The TP module 194 manages the write operation at one or more of SSDs 148A-148N via the SCSI module 199, RAID module 197 and the SATA driver 195.

In block B216E, data is only written to a SSD data LUN (for example, a parent LUN 300, FIG. 3). Data is also mirrored across two ISAs using SSDs 148A-148N at a local ISA (for example, 114D) and at peer ISA nodes (for example, 114E and 114F). For this option, the bridge application module 190 provides the TPBs to TP module 194. The TP module 194 manages the write operation on a local child LUN, for example, 301A (FIG. 3). TP module 194 manages the write to the child LUN configured using one or more of SSDs 148A-148N via the SCSI module 199, RAID module 197 and the SATA driver 195. The write command to mirror data is sent to the peer ISA (for example, 114E and/or 114F) via FC driver 118. The peer ISA then stores the data at its local LUN (for example, 301B).

Thereafter, in block B218, the write request is completed and a status is sent to a client. In one embodiment, bridge application module 190 provides a completion block to the endpoint driver 180. The endpoint driver 180 then prepares an I/O status block 176B that is sent to the adapter driver 172.

Figure 2E:
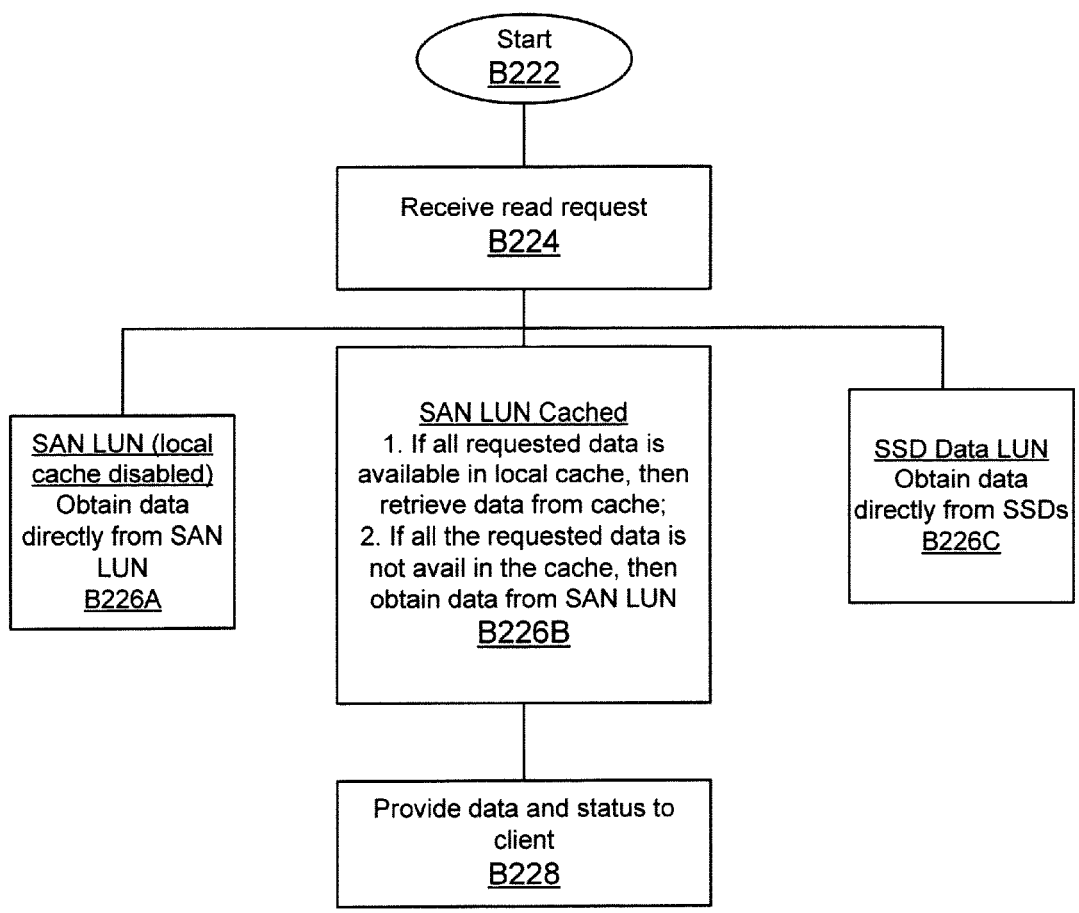

FIG. 2E shows a process 220 for handling read requests, according to one embodiment. The process begins in block B222 when a computing system executing the application 105 is operational with ISA 114. In block B224, a client request is received to read data. The client request may be generated by the application 105 executed by a processor. The client request is provided to the I/O handler 168 that generates IOCB 176A for the read request. The IOCB is provided to adapter driver 172 and then forwarded to endpoint driver 180. A TRB associated with the read request is generated and provided to the bridge application module 190. The read request is processed based on LUN configuration information stored at LUN information data structure 193A. For example, if the read request is for a SAN LUN without using local caching, then it is processed in block B226A. If the SAN LUN is cached, then the request is processed in block B226B. When the data is at a local SSD data LUN, then the read request is processed in block B226C. Bridge application module 190 determines whether the read request is for a SAN LUN with disabled caching, enabled caching or a local data LUN using LUN information data structure 193A.

In block B226A, the bridge application module 190 sends TPBs to the FC driver 198 that sends the read request to the SAN LUN for processing via the storage protocol controller 128. In this embodiment, ISA 114 operates as a host bus adapter.

In block B226B, the bridge application module 190 forwards the request to cache module 177. The cache module 177 determines if all the requested data is in the local cache (for example, SSD 148A-148N) that is assigned as a local cache LUN for the SAN LUN. If the local cache has all the data, then the cache module 177 retrieves the data from SSDs 148A-148N. When all the requested data is not available at the local cache, then the cache module 177 requests the data from the SAN LUN using FC driver 198. In this instance data is retrieved from storage devices 124A-124N.

If the bridge application module 190 determines that the request is directed to a data LUN based on storage space at SSDs 148A-148N, then in block B226C, the request is forwarded to the TP Module 194 so that data can be obtained using SCSI module 199 and the SATA driver 195. In block B228, the data from the appropriate location is obtained and provided to the client (for example, application 105).

Figures 2F, 2G:
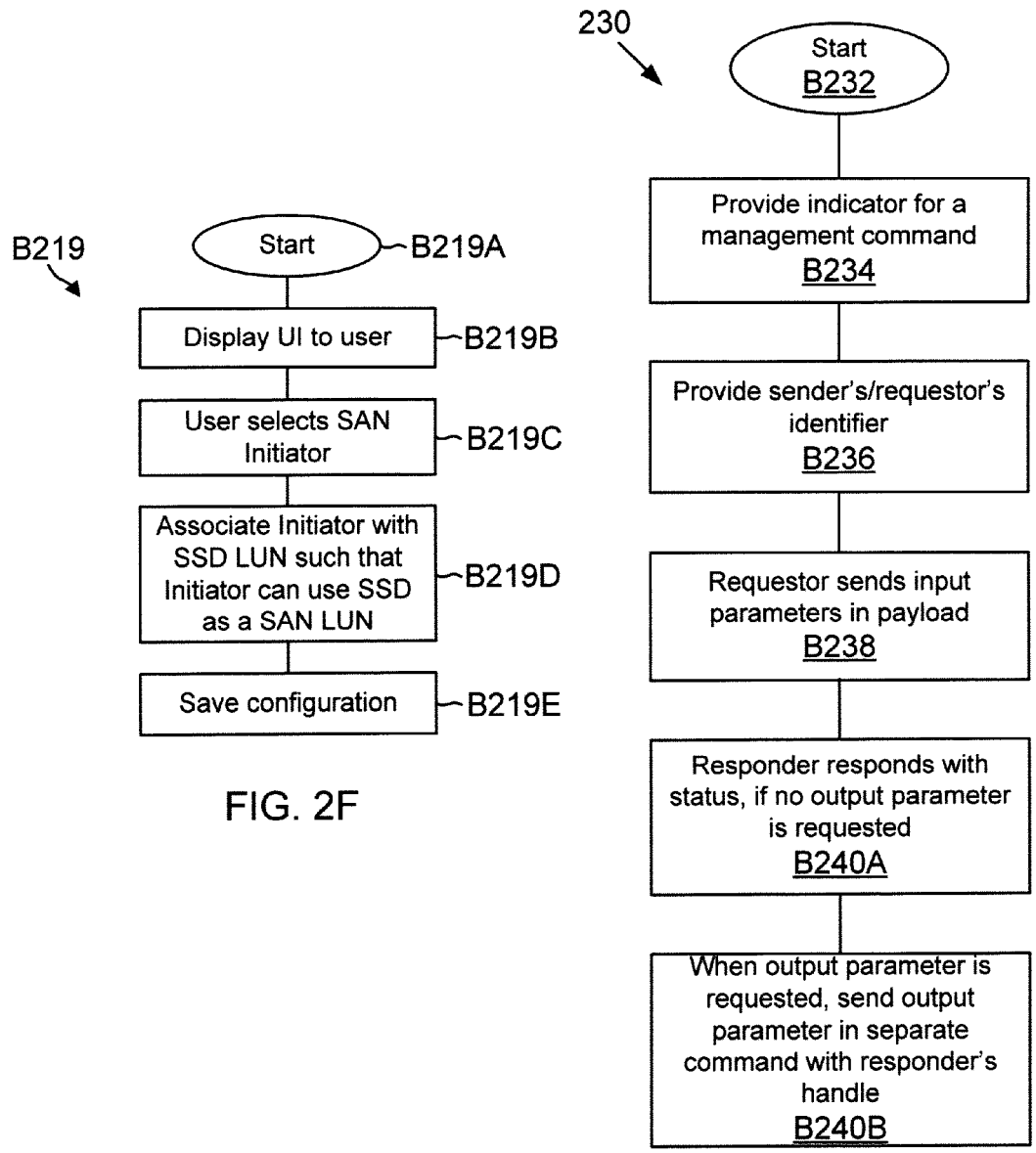
Figure 3:
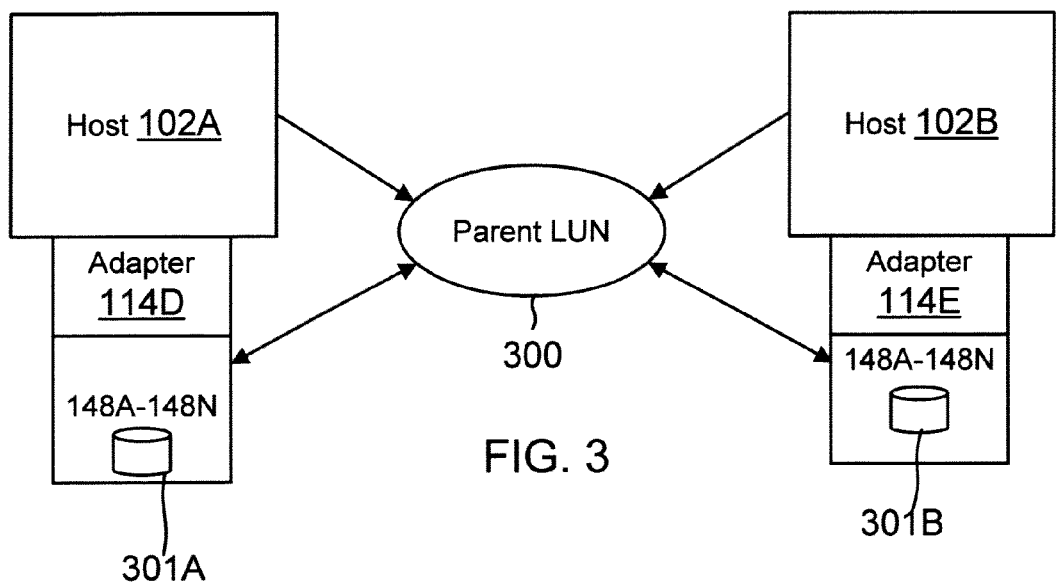
FIG. 3 shows an example of presenting a parent LUN, according to one embodiment.

FIG. 2F shows details of block B219 of FIG. 2C that allows a SSD of ISA 114 to be used as SAN storage via a SAN connection, according to one embodiment. The process begins in block B219A. In block B219B, a user interface is presented on a display device. In one embodiment, management application 117 presents the user interface on a display device.

In block B219C, an administrator selects an "initiator" from among a plurality of initiators. The term initiator as used herein means a computing system or device that will have access to storage space via a SAN connection using one of ports 126A-126N. For example, as shown in FIG. 1E, host system 102B with ISA 114E may be the initiator.

In block B219D, the initiator is associated with a LUN that is based on storage space at a SSD. For example, the SSD LUN may be for an SSD at ISA 114D of host system 102A, while the initiator may be host system 102B. In block B219E, the configuration information (for example, 193A) that allows host system 102B to use the SSD at ISA 114 of host system 102A may be stored at a memory location of ISA 114D/114E of both the host systems.

In one embodiment, a DAS based SSD becomes accessible as SAN storage because ISA 114 includes a storage protocol controller and a SSD. Thus a server can not only have a SSD for local applications but can also make local storage space available to other servers.

FIG. 2G shows a process 230 for handling an in-band management command, according to one embodiment. The term in-band management command means a management command that is sent using a same transport driver, for example, Fibre Channel driver 198. A management command may be sent by an application/host driver to obtain status information or to set a parameter at ISA 114. The nature and type of management command may vary based on different operating environments. The embodiments disclosed herein are not limited to any particular type of managements command.

API calls (or requests) typically have a function code and input parameters. A response to a request may include status and output parameters. Both input and output parameters can be of relatively large size. Typically, a SCSI command includes a relatively small size CDB (e.g. 16 bytes). This may not be enough to describe large input parameters. SCSI Payload can be large and of any size. SCSI command sequence typically has data flowing in one direction i.e. either data is "Read or "Written." Management applications typically operate at a higher level than SCSI transport layers (e.g. FC, iSCSI, FCoE or other transport layers). Thus here is a need for a method for using a SCSI transport for large size input and output parameters that are managed by an application without having to rewrite lower level drivers/code. Process 230 described below provides an example of solving this challenge.

The process begins in block B232 when application 105 executed by a host computing system generates a request or a management command. The request may be received by API handler 170. The application 105 may be executed by a local host system coupled to ISA 114 or from an application executed by a peer host within a cluster. In block B234, an indicator is provided in an API command block (for example, 174A) to indicate that the command block includes a management command. The indicator is provided by API handler 170 based on the request from the application or adapter driver 172.

In block B236, the sender/requestor identifier is provided to the ISA 114. In one embodiment, APICB 174A includes the requestor's identity information. Once APICB 174A is received by ISA 114, the endpoint driver 180 allocates an ACB for the APICB 174A and provides the ACB to ISA API handler 184. The ISA API handler 184 then forwards a control command to bridge application module 190. The bridge application module 190 then allocates a TRB/TPB for the ACB and sends a request to obtain the payload for the APICB 174A. If the payload is to be obtained from another ISA in a cluster, then the FC driver 198 may be used to obtain the payload via the storage protocol controller 128.

In block B238, the requestor sends an input parameter for the payload APICB 174A. In one embodiment, the input parameter may be received by endpoint driver 180 and then passed to ISA API handler 184. In another embodiment, input parameters may be received by the FC driver 198 as SCSI data and then passed to ISA API handler 184.

In block B240A, the responder responds with status if no output parameters are requested. If an output parameter is requested, then in block B240B, output parameters are sent using a separate SCSI command "CDB" that includes a response handle received in the original request. Thus a single API call that has a large size input and output parameter is executed using two SCSI commands, one from the requestor to send the input parameters and the second from the responder with output parameters. The responder in this context can be the ISA API handler 184 that manages the response from different modules within ISA 114.

FIG. 3 shows an example of a parent LUN 300 that is shared between two host systems 102A and 102B having ISAs 114D and 114E. The parent LUN 300 is presented to host systems 102A and 102B may include a LUN 301A that is based on storage space at SSD 148A-148N managed by ISA 114D and LUN 301B based on storage space at SSD 148A-148N managed by ISA 114E. If the parent LUN is configured for mirroring, then any data written by either host system is stored at LUN 301A and also mirrored at LUN 301B (i.e. the remote SSD for host system 102A). In case parent LUN 300 is not configured as a "Mirror LUN," then LUNs 301A and 301B may operate as two segments of the parent LUN 300. In that instance, the size of the parent LUN 300 is equal to the size of 301A and the size of 301B.

Figures 4A, 4B:
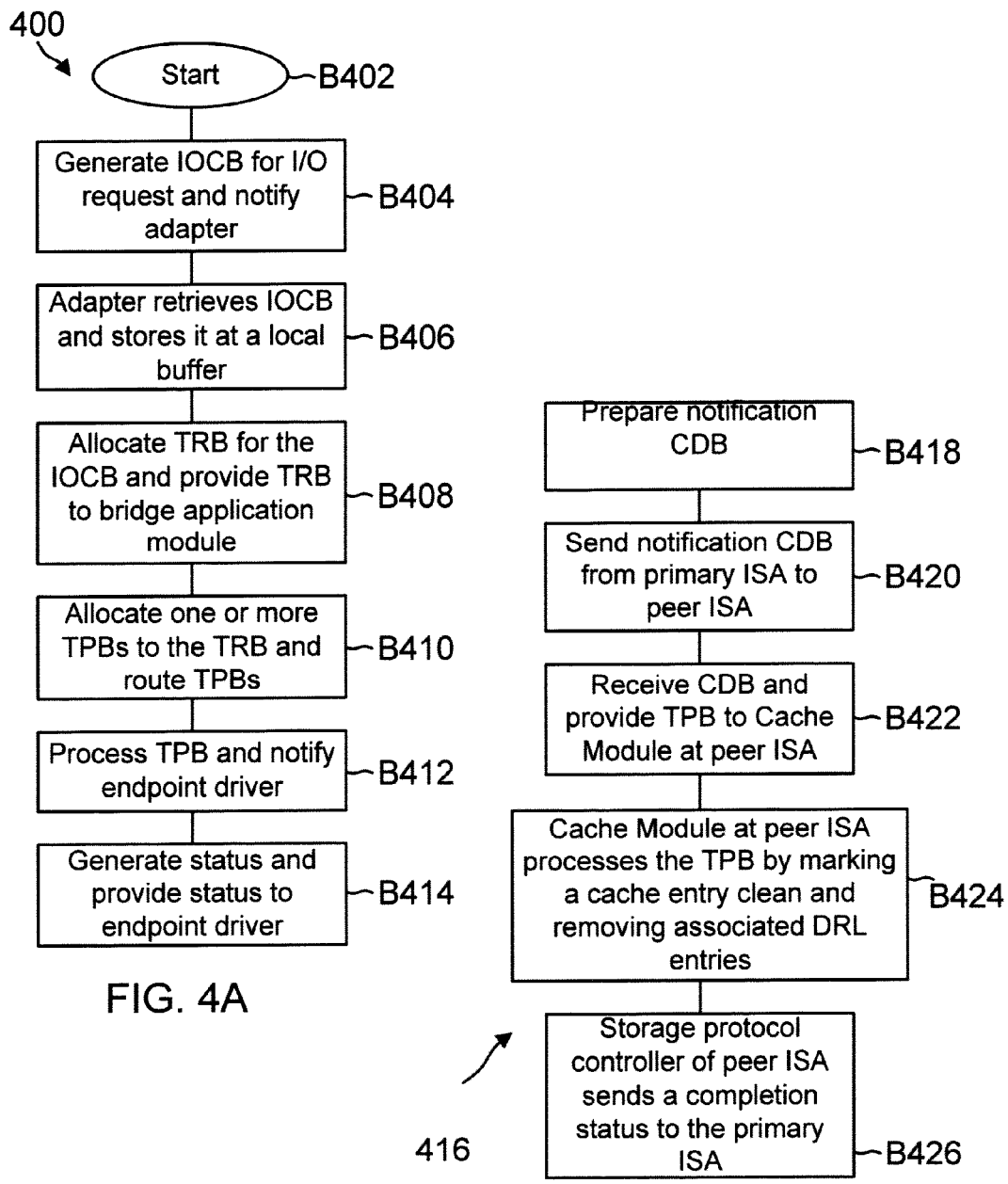
FIGS. 4A-4C show process flow diagrams of various embodiments of the present disclosure.

FIG. 4A shows a block diagram of a detailed process 400 for handling IOCBs issued by a host system 102A, according to one embodiment. The process begins in block B402, when application 105 executed by processor 104 sends an I/O request to adapter driver 172. The request may be to read or write information.

Based on the I/O request, in block B404, an IOCB 176A is generated by I/O handler 168. The IOCB provides the identity of the requestor, the type of operation i.e. read or write, and at least the logical address of where data may need to be stored or read from.

In block B406, endpoint driver 180 detects that the IOCB 176A has been added to a request queue maintained at host memory 106. The IOCB is then copied via a DMA operation to a memory location at memory 132 maintained by ISA 114. In block B408, a TRB is allocated by the endpoint driver 180. Information from the IOCB 176A is copied to the allocated TRB and the TRB is then provided to the bridge application module 190.

In block B410, the bridge application module 190 detects the TRB at an inbound queue (not shown) for the bridge application module 190. The queue is maintained by ISA 114 at a memory location. The bridge application module 190 allocates one or more TPBs to the TRB, if the TRB is valid. The TPBs are then queued for the appropriate module, as described below in detail. If the command is invalid, it is returned to the adapter driver 172.

In block B412, based on the TRB, the TPBs are processed by the appropriate module, for example, the cache module 177, the TP module 194 and/or the DM module 196. The following describes how the TPBs can be processed, depending on the TPB type and the storage (i.e. local SSD storage 148A-148N and/or SAN-based storage 124A-124N) that is affected by the TPB to either read or write data.

When the TPB is meant for the TP module 194, the TP module 194 determines if the target of the TPB is a local storage device (for example, SSD 148A-148N) or a parent LUN 300 (FIG. 3) configured as a mirror LUN. When the target is a parent LUN, then TPB module 194 generates a modified TPB (may be referred to as TPB_A) that is based on the received TPB. TPB_A is targeted to a local storage LUN 301A and TPB_B is targeted to the remote storage LUN 301B. Based on original request for the parent LUN, a DRL entry is generated as "temporary" DRL entry for the DRL 187. TPB_B targeted to remote LUN 301B is provided to FC driver 198 to send the request to the peer ISA114E via storage protocol controller 128. TPB_B is marked complete by the FC Driver 198 either by receiving a completion from ISA114E or being aborted by FC driver 198. Upon successful completion of TPB_A and TPB-B, the associated DRL entry (marked as temporary) is deleted from the DRL 187. If either TPB_A or TPB_B failed, the DRL entry is saved as a permanent DRL entry and data in this region may be duplicated at a later time. When a permanent DRL entry is created, the mirror operation is marked as being in a fractured state. Using the permanent DRL entry, the fractured mirror operation can be restored at a later time.

When the TPB is for local storage, then TP module 194 provides the TPB_A to the RAID module 197. The RAID module 197 processes the TPB_A and creates the appropriate storage operations to store the data to local storage. The data is written at local storage and the RAID module 197 updates TPB_A to indicate that data has been written.

In block B414, the endpoint driver 180 is notified when the TRB processing is complete. Endpoint driver 180 generates a status block (176B) for the adapter driver 172. Thereafter, the process ends.

In one embodiment, two ISAs communicate with each other using SCSI based CDBs to perform house-keeping operations like exchanging heartbeat or communicating when data is flushed in case of a Write Back operation described above with respect to block B216C in FIG. 2D. The messages are exchanged using SCSI CDBs and payload.

FIG. 4B shows a process 416 for processing a CDB involving a Write Back operation, according to one embodiment. As explained above, the Write Back operation is used to mirror data that may be written at a local cache LUN. For example, with respect to FIG. 3, assume that adapter 114D is a primary owner of the parent LUN 300 and cache LUN 301A is to be mirrored at LUN 301B managed by ISA 1141E.

When data is written to LUN 301A, it is later mirrored at LUN 301B and written to a SAN LUN (not shown in FIG. 3). A DRL entry for DRL 187 is created by ISA 114D to track the write operation. The DRL entry include a SAN LUN index (i.e. a listing of SAN LUNs where the data is written to from cache LUN 301A), starting LBA and size of a dirty block within the cache LUN 301A and the location of the dirty block at the local SSD (148A-148N). ISA 114D notifies ISA 114E of the DRL entry so that ISA 114E is aware of the data that is written to cache LUN 301A.

After data is written to cache 301A, each cache 301A entry includes the number of DRL entries that are created for the cache entry. ISA 114D periodically flushes data from the dirty cache entry of cache LUN 301A to a SAN LUN by using a DRL list that provides ISA 114D with a list of DRL entries. After the cache entry is flushed and all DRL entries associated with the cache entry are accounted for, the primary ISA 114D notifies ISA114E by sending an in-band message. The message contains the SAN LUN ID and LBA range that has been flushed. In one embodiment, ISA 114D uses a VU CDB with a payload to indicate that a specific cache entry is now clean is created by the cache module 177 at the ISA 114D. The term "clean" as used herein means that data for the cache entry has been written (or flushed) to a SAN LUN or another location. The VU CDB is sent to ISA 114E via storage protocol controller 128.

The process 416 begins when ISA 114D wants to notify ISA114E that a cache entry for cache LUN 301 is clean. ISA 114D prepares a CDB for the notification. The CDB is based on a TRB that is provided to FC driver 198. The FC driver 198 provides the CDB to the storage protocol controller 128 that sends the CDB to ISA 114E in block B420.

ISA 114E receives the CDB in block B422. The CDB is then provided to the cache module 177 of ISA 114E.

In block B424, cache module 177 at ISA 114E that tracks dirty entries of ISA 114D marks the cache entry for cache LUN 301A as clean and removes any associated DRL 187 entries. Thereafter, in block B426, the cache module 177 prepares a completion message and provides the completion message to FC driver 198. The FC driver 198 then sends the completion message via storage protocol controller 128 to ISA 114D.

Figure 4C:
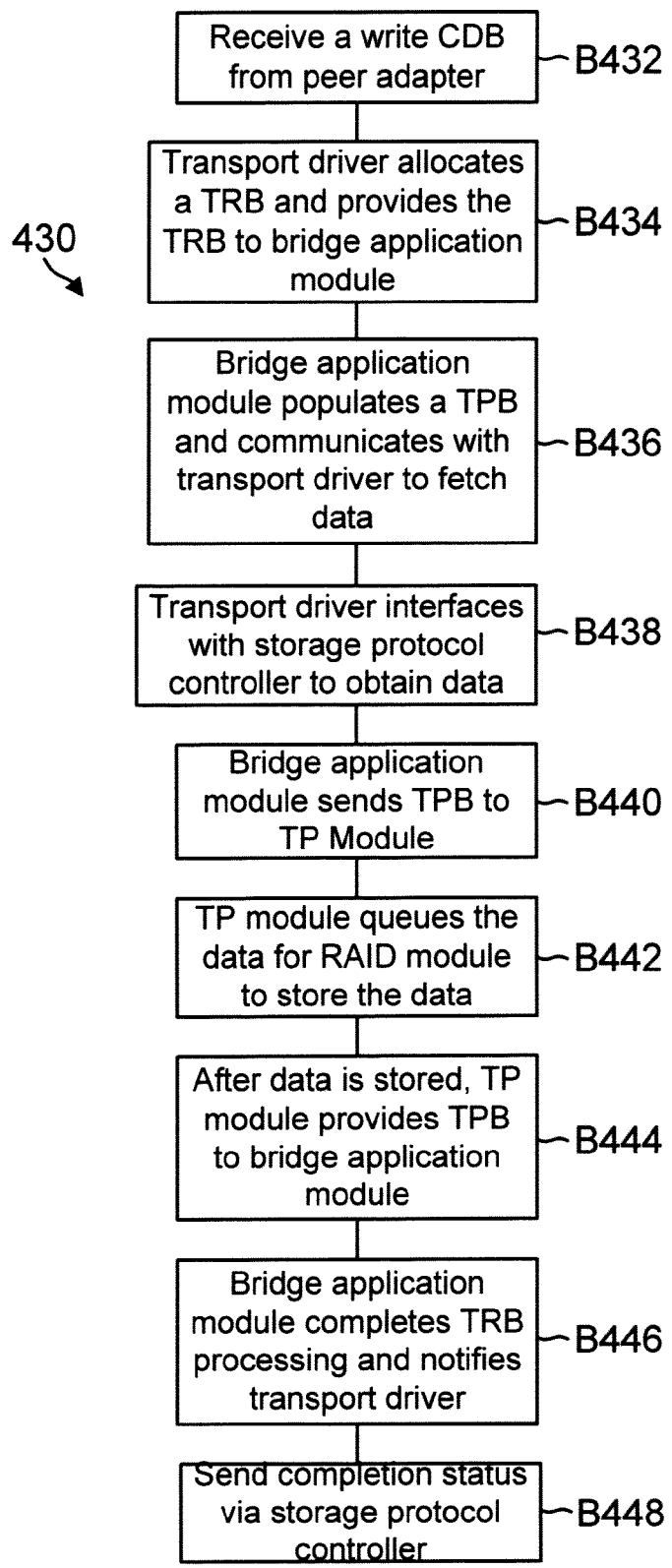

FIG. 4C shows a process 430 for processing a write CDB received from a peer ISA node, for example, ISA 114E receives a write CDB from ISA 114D for a Write back operation. In block B432, the CDB is received by storage protocol controller 128 and passed on to the FC driver 198. In block B434, the FC driver 198 generates a TRB for the CDB and provides the TRB to the bridge application module 190. In block B436, the bridge application module 190 allocates a TPB for the TRB and requests the FC driver 198 to obtain the data for the CDB.

In block B438, the FC driver 198 interfaces with the storage protocol controller 128 to obtain the data for the CDB. For example, the storage protocol controller 128 sends a transfer ready command to the peer ISA 114D. The peer ISA 114D then sends the data for the CDB.

In block B440, the bridge application module 190 sends the TPB to the TP module 194. In block B442, the TP module 194 queues the data for the TPB for the RAID module 197 that communicates with the SCSI module 199 to store the data at a local storage location, for example, SSD 148A-148N. After the data is stored, in block B444, TP module 194 provides the TPB back to the bridge application module 190. The TRB processing is completed in block B446 and the FC driver 198 is notified. In block B448, the FC driver 198 communicates with the storage protocol controller 128 to send a completion status block for the CDB. Thereafter, the storage protocol controller 128 sends out a completion status block (for example, a FCP_RSP_IU with a SCSI status) to the peer node.

Figure 5A:
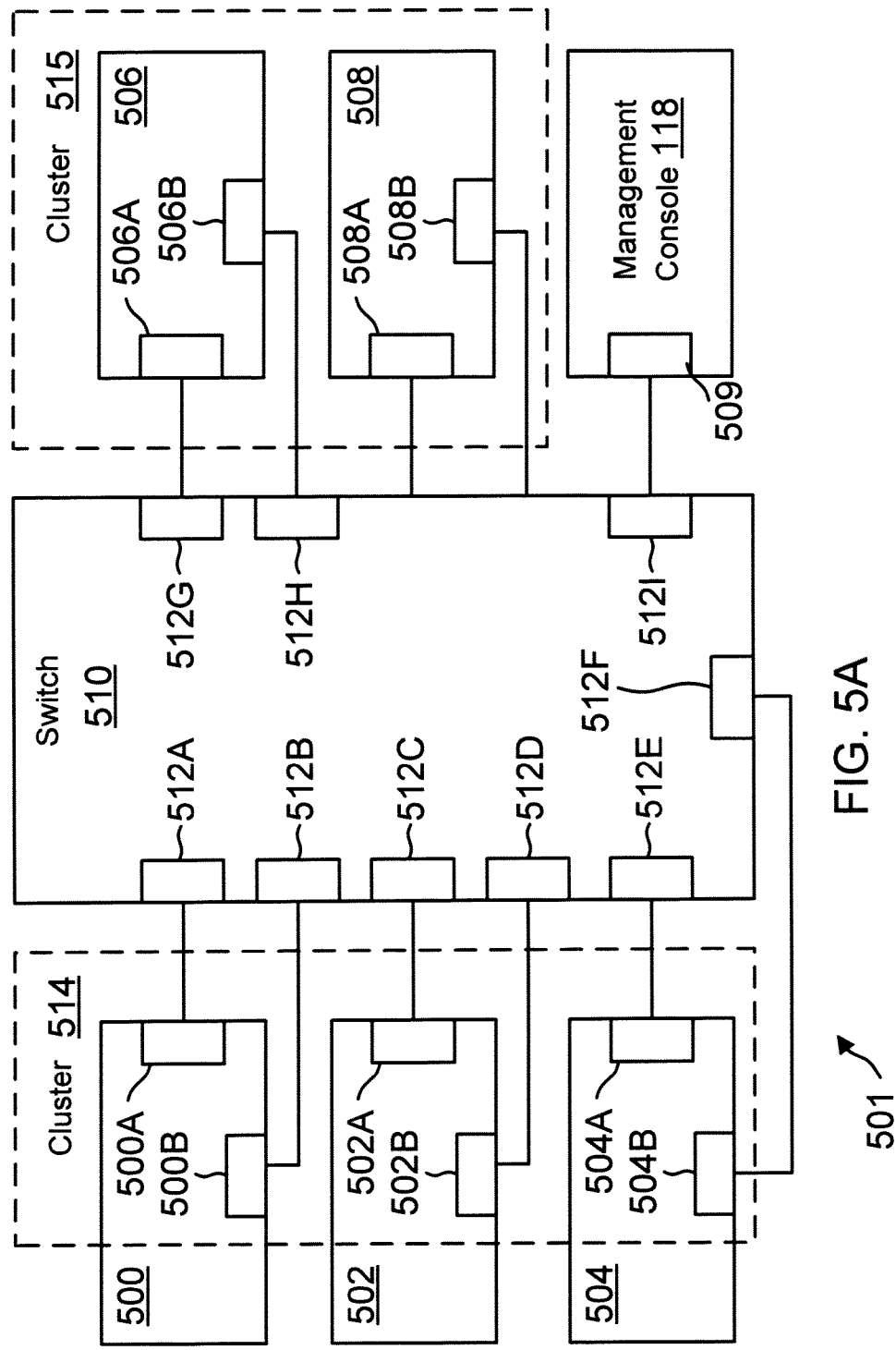
FIG. 5A shows an example of a cluster using the ISAs according to one embodiment.

FIG. 5A shows a system 501 having a plurality of ISAs 500, 502, 504, 506 and 508, similar to ISA 114 that has been described above in detail. Each ISA may have a plurality of ports, for example, ISA 500 has ports 500A/500B. ISA 502 has ports 502A/502B. ISA 504 has port 504A/504B, ISA 506 has ports 506A/506B and ISA 508 has ports 508A/508B similar to ports 126A-126B (FIG. 1B). The ports at each ISA are controlled by the storage protocol controller 128 that has been described above. The various ISAs are operationally coupled to a switch 510 (similar to switch 160, FIG. 1E) having a plurality of ports 512A-512I. Switch 510 may be a Fibre Channel Fabric switch or any other switch type. Management console 118 executing management application 117 may be used to configure the various ISAs to operate within one or more cluster.

In one embodiment, the term cluster, as used herein means, a logical entity that has members who are permitted to share resources with each other. The nature of the permissions may be customized by an administrator based on policies that are set for an organization. As an example, ISA 500, 502 and 504 may be configured to operate as members of a cluster 514, while ISAs 506 and 508 may be members of cluster 515. The process for creating a cluster and permitting cluster based communication via cluster module 192 (FIG. 1F) are now described below.

Figure 5B:
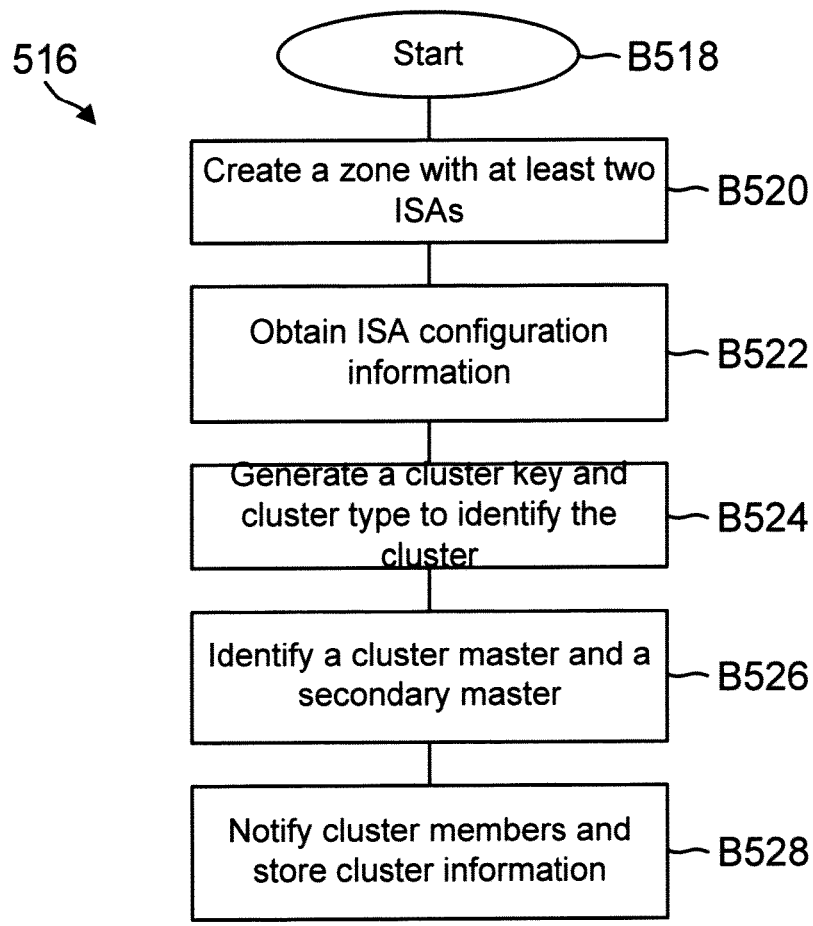
FIGS. 5B-5F and 6 show other process flow diagrams of various embodiments of the present disclosure

FIG. 5B shows a process 516 for configuring a cluster, for example, 514, having a plurality of ISAs, according to one embodiment. The process begins in block B518, when an interface for management application 117 is displayed on a display device. The display may be a part of management application 117 or may call into the management interface 117. The interface may be GUI based or a CLI (command line interface).

In block B520, one or more zones may be created. A zone includes ports that are permitted to communicate with each other. Zoning processes may be provided by protocol/standards, for example, Fibre Channel. In one embodiment, switch 510 stores zoning data at each switch port. This allows switch ports to accept frames or reject frames based on whether frame destinations are permitted for a specific zone.

In block B522, the management application 117 obtains configuration information regarding the ISAs. The configuration information may include unique identifiers for the ISA (for example, world-wide node number (WWNN) and world-wide port identifier information), protocols that are supported by the ISAs and any other information type.

In block B524, the management application 117 defines a cluster identified by a unique identifier or a cluster key and the cluster type. The cluster type may vary based on the operating system used by the various computing systems within a cluster. Examples of some cluster types are Microsoft Windows cluster (MSCS) provided by the Microsoft Corporation, a VMWare Cluster provided by the VMWare Corporation, an Oracle RAC cluster provided by the Oracle Corporation and others. The embodiments herein are not limited to any particular cluster type. The uniquely identified ISAs within a cluster are also identified by a cluster member identifier (Id). The cluster member ID may be based on the least significant bytes of a MAC (media access control) address that is used to generate the WWNN. The embodiments disclosed herein are not limited to any particular type or format that is used to generate the cluster key or the cluster member Id.

Since each cluster has more than one ISA, the management application 117, in block B526 identifies a cluster master and a secondary master, in case the primary master goes down for any reason. The primary cluster master operates as an "arbiter" among the ISAs in case there is any conflict between the member ISAs.

In block B528, all the cluster members are notified and the cluster information is stored. In one embodiment, the cluster information, namely, cluster ID, cluster member Ids and cluster member status is stored in configuration data structure 117A. The member ISAs store the cluster information as cluster data 192A. The cluster module or any other module is able to use cluster data 192A to facilitate cluster communication.

Figure 5C:
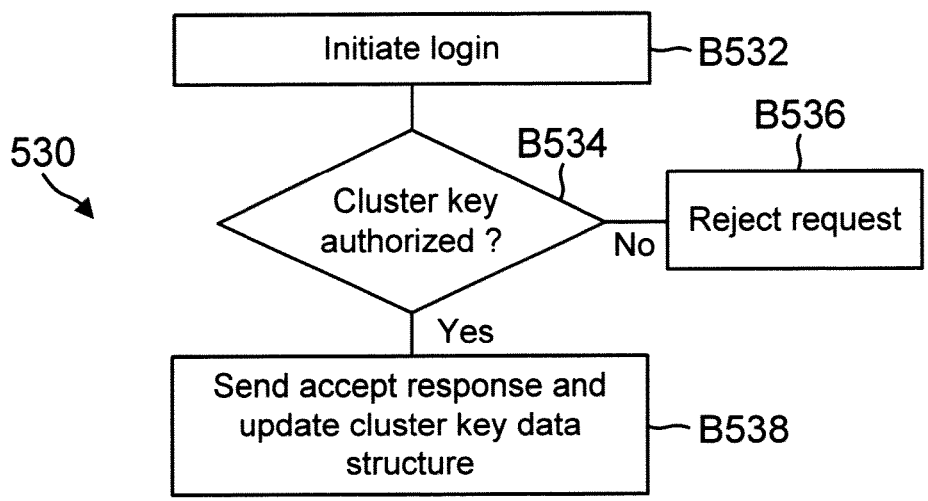

FIG. 5C shows a process 530 for initializing communication between two cluster ISAs, according to one embodiment. The process begins in block B532, when an ISA, for example, 500 initiates communication with another cluster member, for example, 502 of cluster 514 (FIG. 5A). In one embodiment, the login process may be prescribed by the protocol that may be used between the ISAs. For example, if port 500A operates as a Fibre Channel port, then the port initiates a PLOGI, a port login procedure provided by the Fibre Channel standards. If the port is operating as an iSCSI port, then the port uses iSCSI login procedures. To initiate contact, port 500A sends a packet with its own cluster member ID and the cluster key.

In block B534, the receiving ISA, for example, 502 verifies if the cluster ID and the cluster member Id matches with the cluster information stored as 192A. If there is no match, the ISA 502 sends a reject message in block B536. If the information matches, then in block B538, ISA 502 sends an accept response and updates the data structure 192A to indicate that communication with ISA 500 i.e. the peer ISA has been established.

In one embodiment, a VUCDB format is provided for sending messages among cluster members and for performing in-band managementusing a transport driver 198 and storage protocol controller 128 described below. The following table provides an example of the CDB format. The first column provides a byte offset, the second provides the field for byte offset, and the third column describes the field. The various bytes/format for the VU CDB are provided below.

TABLE I

| Byte Offset (h) | Field | Description |
| --- | --- | --- |
| 0 | OpCode | Operation Code |
| 1-4 | Vendor Tag | Identifies the CDB as a VU CDB |
| 5 | Version | Identifies the version of a CDB format |
| 6-7 | Service Action Code | Service Action Code to be performed embedded in theCDB |
| 8-B | Data Length | Amount of data to be transferred (in bytes) |
| C-F | Handle | Uniquely identifies the CDB |

Byte 0 of the VU CDB may have an OpCode 0xC1. OpCode 0xC1 may be interpreted as a command directed to a Controller LUN or LUNs accessible by a given Initiator.

Byte 1 through 4 may be used to provide a vendor signature, for example, a signature to identify the vendor providing the ISA or the ISA itself. Byte 1 may include the most significant bit (MSB) of the signature and Byte 3 may be used to include the least significant bit (LSB) of the signature. Hexadecimal value of each character is stored in the CDB.

Byte 5 of the VU CDB indicates a version level. The version level is used to interpret the payload.

Bytes 6-7 include a Service Action Code that are used to interpret the type of action that needs to be performed for a CDB payload specified in bytes 8-11 of the CDB. Table II below provides an example of various service action codes that may be embedded in a VU CDB.

TABLE II

| Opode (h) | Description |
| --- | --- |
| 1 | Write type, in-band-management, "GET" type command to obtain information. "Sense Data" returned by the ISA. |
| 2 | Write type, in-band management "SET" type command for setting a parameter or feature. |
| 3 | Response Data with a same handle value that was received in a GET command. |
| 4 | Cluster Member Communication - Request. "Sense Data" returned by the ISA and includes a Flag and Handle. |
| 5 | Heart Beat message between Cluster Members to determine if other member is on-line. |
| 6 | Cluster Member Communication - Response |
| 7-0xFFFF | Reserved |

Sense data may be used to provide response codes. For example, sense data may include a vendor tag for identifying the vendor (or the ISA), a status code, a flag, a handle and any other information. In one embodiment, the handle may be the same as the one received with the CDB.

Figure 5D:
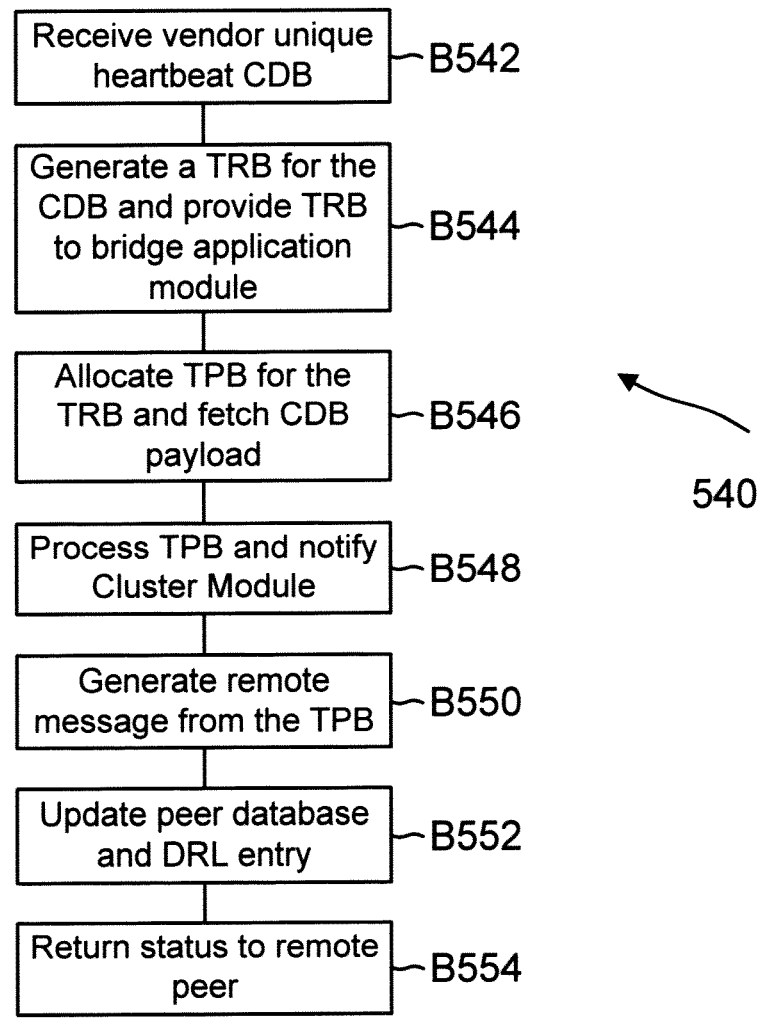

FIG. 5D shows a process 540 for processing a "heartbeat" CDB, according to one embodiment. The heartbeat CDB is used to ascertain if another cluster member (ISA) is operating and on-line. The process begins in block B542, when a vendor unique heartbeat CDB is received by an ISA (for example, ISA 500) from a remote peer (for example, ISA 502). In one embodiment, the heartbeat CDB may be received by storage protocol controller 128 as an embedded Fibre Channel packet. The packet is passed to the FC driver 198 (or a transport driver, when a different protocol is used). In block B544, the FC driver 198 generates a TRB for the heart beat CDB. The TRB is then provided to bridge application module 190.

In block B546, the bridge application module 190 then generates a TPB for the TRB. The bridge application module 190 requests the FC driver 190 to fetch the payload for the CDB. The FC driver 190 obtains the CDB via storage protocol controller 128. For example, storage protocol controller 198 may send a FCP_XFER_IU command to the remote ISA and the storage protocol controller at the remote ISA then sends the payload to the local ISA (in this example, ISA 500). When all the data is received, the FC driver 198 provides the data to the bridge application module 190.

In block B548, the bridge application module 190 processes the TPB for the payload and provides the processed TPB to cluster module 192. Based on the TPB, the cluster module 192 generates a remote message (RMSG) for the remote ISA. In one embodiment, the cluster module 192 maintains a heartbeat thread 192B with a data structure. The data structure maintains information regarding peer ISAs of a cluster that are available or unavailable. In another embodiment, the heartbeat thread 192B may be a part of cluster information structure 192A.

In block B552, the heartbeat thread 192B is updated to indicate that the remote ISA that sent the CDB is alive. The heartbeat thread 192B also updates DRL 187 entries that may have been completed by the remote ISA and removes those entries from the DRL 187. Thereafter, the TPB associated with the RMSG is queued back to bridge application module 190. The bridge application module 190 processes the TPB and notifies the FC driver 198.

In block B554, the FC driver 198 notifies the storage protocol controller 128 to return a status to the remote peer. The storage protocol controller 128 sends a response back, for example, a FCP_RSP_IU to the remote peer. Thereafter, the heartbeat CDB processing is completed.

Figure 5E:
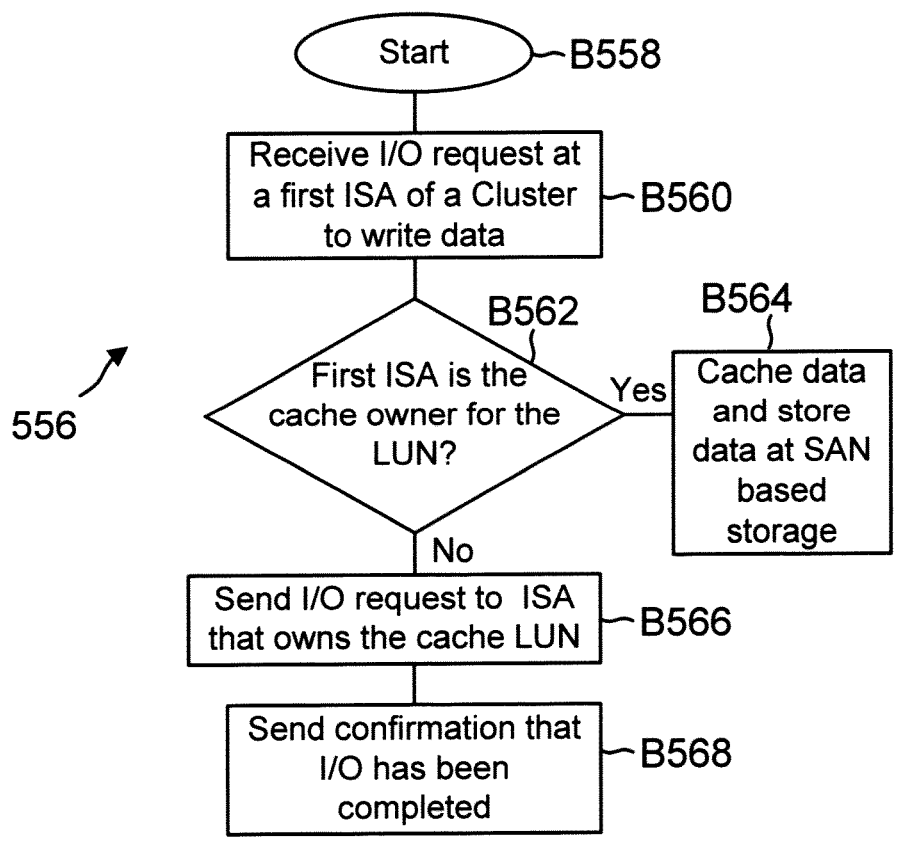

FIG. 5E shows a process for maintaining cache coherency in a cluster environment 501 of FIG. 5A. Cache coherency is needed because in a cluster environment, if multiple computing systems can access the same storage space, then one has to ensure that the data that is being provided to a computing system is the latest data at a storage location. For example, a computing system of ISA 500 and a computing system of ISA 502 may share a LUN. Each ISA may also use the local SSD as a cache providing data to the computing system. Because each computing system may write data to the SAN independently, cache coherency has to be maintained such that the latest data is provided when requested by the computing systems.

To ensure cache coherency and to reduce the number of messages needed to keep data synchronized amongst multiple members of the cluster, a cache region is defined at a LUN level. This means that a LUN is cached by a single (two in case of a Mirror Write Back cache) ISA 500. In another embodiment, a cache region may be defined as a part of the LUN. When a user assigns the cache ownership to an ISA using management application, using in-band management process as described above, cache ownership is communicated to all ISA members (500, 502, 504 in FIG. 5A). This information is kept current and managed by the cluster master defined in step B526. As described below in detail, process 556 and 570 ensure cache coherency among the various ISAs of FIG. 5A.

Process 556 begins in block B558 when a cluster, for example, 514 is operational. In block B560, an I/O request is received by a first ISA, for example, 500 to write data to a storage location. The I/O request specifies the LUN, the amount of data that is to be written and other information. Based on the I/O request, the first ISA determines if it is the "cache owner" for the specified LUN. The cache owner is assigned during a LUN configuration operation using a management application. The cache ownership designates a particular ISA to write to a given LUN. This ensures that only one ISA has authority to manage write operations to a designated LUN. The LUN ownership information may be stored as part of a configuration data structure in memory 132/138 or any other location. Processor 130 is able to read the data structure and determine if it is the LUN owner.

If the first ISA is the LUN owner, then in block B564, the data may be cached at the local SSD and stored at a SAN-based storage device, as described above. If the first ISA is not the LUN owner, then in block B566, the first ISA determines who the LUN owner may be. This information may also be stored at the first ISA when the cluster is configured. The information may be stored at memory 132/138 or any other location. The configuration may include LUN attributes including identity of a LUN owner i.e. identity of the ISA who may be the LUN owner. The I/O request is then sent to the ISA that owns the LUN by the cluster module 192 of the first ISA. The ISA that owns the LUN then writes the data and notifies the first ISA of the completion. Thereafter, in block B568, the first ISA sends a confirmation to the application that generated the I/O request in block B560.

Figure 5F:
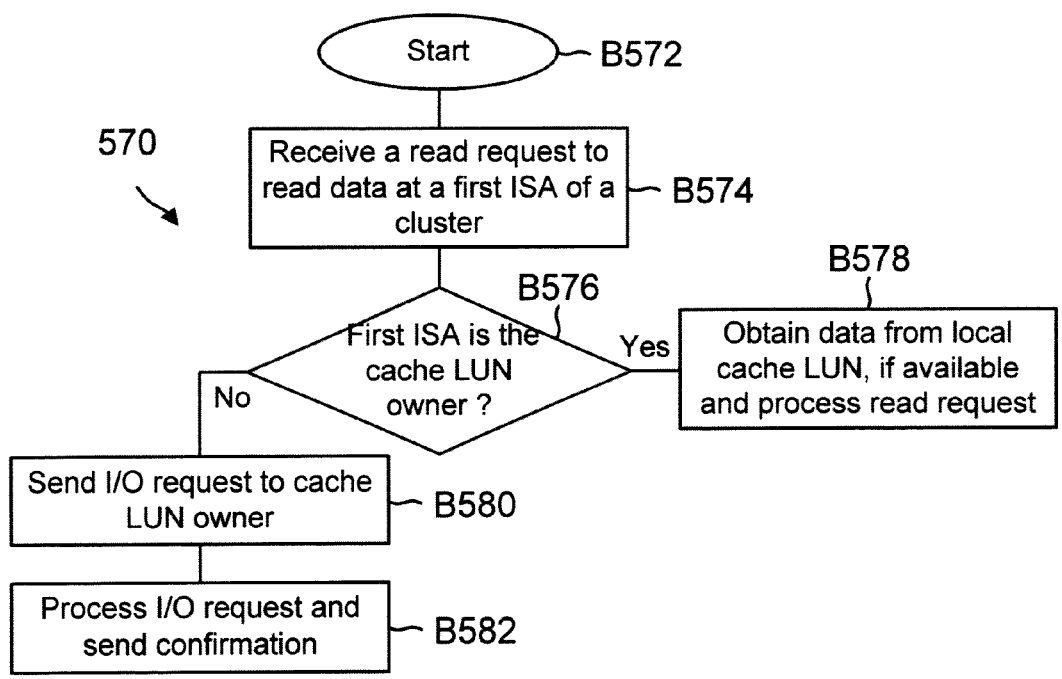

FIG. 5F shows a process 570 that is similar to the process 556 of FIG. 5E, except the I/O request is for reading data. The process begins in block B572. In block B574, a read request to read data for a shared LUN is received by a first ISA, for example, 500, FIG. 5A. Similar to block B562 (FIG. 5E), the first ISA determines if it is the LUN owner. If yes, then in block B578, the first ISA obtains data from a local SSD, if available and configured. The read request is processed and a status is provided to the application that generated the read request.

If the first ISA is not the owner, them in block B580, the read request is sent to the LUN owner, similar to block B566, FIG. 5E. The read request is processed in block B582, similar to the write request in block B568 and the process ends.

In one embodiment, an in-band management process and system is provided for sending management commands to the ISAs. The term "in-band" as described above means using the same transport protocol (for example, Fibre Channel, FCoE and others) to send I/O requests and management commands. An external initiator (i.e. an ISA, for example, 502, FIG. 5A) may issue an in-band management command to any LUN that is mapped to the initiator. An ACB payload describes the action that may be needed in response to the management command. The management commands may be a "GET" or "SET" type to obtain information or to set certain parameters. Both GET and SET may be a write type command with a handle. A response to the GET type command will be a VU CDB with service action code-response data, described above.

Figure 6:
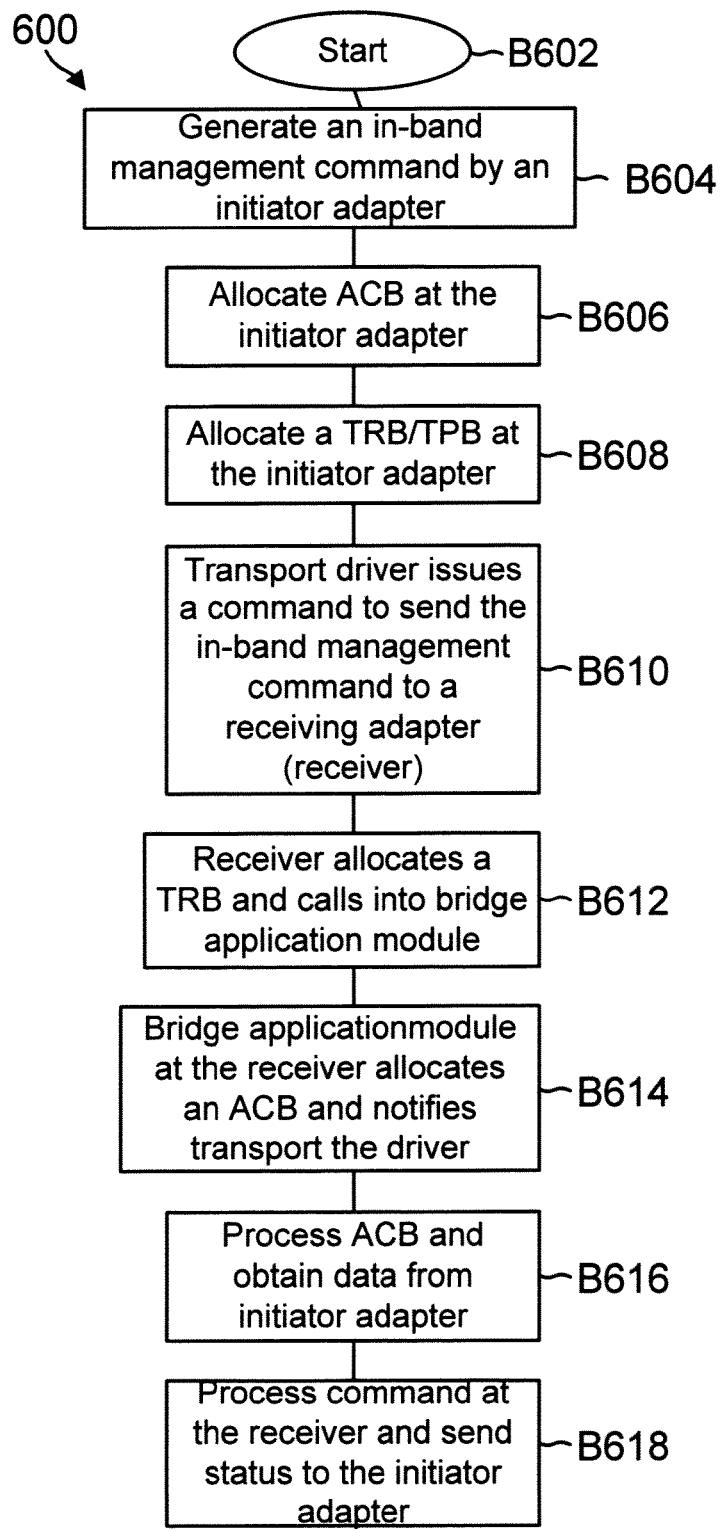

FIG. 6 shows a process 600 for processing an in-band management command (for example, a GET and/or SET type command), according to one embodiment. In conventional systems, typically, a Fibre Channel port is used for handling I/O requests and a separate Ethernet or other network port type is used to send and receive management commands. In one embodiment, an in-band management technique is provided, where the same port, for example, the Fibre Channel port can be used to issue management commands and the I/O requests. Thus separate ports are not needed for processing management commands which reduces overall complexity and cost of an adapter.

The process begins in block B602. In block B604, a management command to get or set information is generated. The ISA generating the command is referred to as an initiator, while the ISA responding to the command may be referred to as a responder. Thus, if ISA 502 generates the management command, then it is the initiator and if ISA 500 is responding to the command, then it is referred to as the responder or receiver. The management command may be received by API handler and passed to the ISA, as shown in FIG. 1F.

In block B606. ISA 502 allocates an ACB for the command, sets up destination information, assigns a sequence number and a timestamp for the ACB. The ACB is provided to the ISA API handler 184 that notifies the bridge application module 190. In block B608, the bridge application module 190 at the initiator allocates a TRB/TPB for the ACB. The bridge application module 190 then calls into a transport driver (for example, FC driver 198).

In block B610, the transport driver 198 allocates a handle for the TPB and issues a command for the storage protocol controller 128 to send the in-band command to ISA 500 (i.e. the responder) using the same port that it uses for processing I/O requests. The storage protocol controller 128 then sends the in-band command to ISA 500.

Blocks B612-B618 are performed at ISA 500 that receives the in-band command. In block B612, the in-band command is received at a port of ISA 500. The port controller (for example, storage protocol controller 128) notifies the transport driver (FC Driver 198). The FC driver 198 allocates a TRB for the command and notifies the bridge application module 190. In block B614, the bridge application module 190 identifies the command as an ACB request, allocates any memory buffers that may be needed to process the request and notifies the FC driver 198.

In block B616, the FC driver 198 processes the TPB or ACB, issues a request for the storage protocol controller 128 to obtain any data or payload from the initiator. The storage protocol controller 128 obtains the data from the initiator and the data is then provided to the bridge application module 190.

In block B618, the bridge application module 190 calls the ISA API handler 184 that assigns a handle to identify the command and starts processing the request. The ISA API handler 184 provides the results of the processing to bridge application module 190. The bridge application 190 then notifies the FC driver 198 to complete the processing and send a status and sense data back to the initiator.

The sense data and the status are sent to the initiator and the FC driver of the initiator receives the response. The response is provided to the bridge application module 190 at the initiator that completes the processing of the ACB at the initiator.

In one embodiment, the foregoing describe method and systems for providing an intelligent adapter that can operate as a host bus adapter as well as a storage controller for managing storage devices as cache LUNs as well as data LUNs. The adapters may operate within a cluster serving a plurality of nodes. Cache coherency is maintained while storage space is accessed by a plurality of nodes (or computing systems).

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
creating a cluster having a plurality of member adapters, each member adapter directly coupled to a computing device via a peripheral bus;
identifying a primary master adapter that arbitrates between other cluster member adapters and a secondary master adapter that takes over a role of the primary master adapter, in case the primary master adapter fails;
providing cluster information to all the member adapters, the cluster information includes a unique cluster identifier, an identifier for identifying each cluster member adapter and a status of each cluster member adapter;
storing the cluster information by each member adapter for enabling authorized communication between the cluster member adapters;
configuring a cache region as part of a logical unit number (LUN) and assigning ownership of the cache region to a member adapter and notifying each cluster member adapter of the cache region owner such that any request to write to the LUN is forwarded to the cache region owner;
a first adapter from among the plurality of member adapters, receiving a request to write data at a storage location represented by the LUN presented to an application executed by a first computing device coupled to the first adapter via a peripheral bus;
wherein the first adapter includes a storage protocol controller operating as a host bus adapter for interfacing with a storage device accessible via a storage area network (SAN) and processing input/output requests for storing information at and reading information from the storage device accessible via the SAN; and the first adapter includes a first solid state storage device (SSD), where storage space of the SSD is configured to operate as a first cache logical unit number (LUN) for storing data; and the first adapter is a part of the cluster having at least a second adapter from among the plurality of member adapters with a second SSD whose storage space is configured to operate as a second cache LUN; and
the first adapter writing the data to the first cache LUN at the first SSD, when the first adapter is a cache owner of the LUN presented to the application, otherwise the request is sent to the second adapter that is the cache owner of the LUN presented to the application and the second adapter processes the request to cache data at the second cache LUN at the second SSD.

2. The method of claim 1, wherein storage space at the first SSD and the second SSD is presented as a shared logical entity to the first computing device and a second computing device coupled to the second adapter for storing information.

3. The method of claim 1, wherein the second SSD operates to mirror any data stored at the first SSD.

4. The method of claim 1, wherein the LUN is based on storage space at the SAN accessible storage device and the first cache LUN is used to store data at the first SSD and then transfer data to the SAN accessible storage device.

5. The method of claim 1, wherein the LUN is based on storage space at the SAN accessible storage device and the first cache LUN is used to store data at the first SSD and then transfer data to the SAN accessible storage device and also mirror data at the second SSD.

6. The method of claim 1, wherein the storage protocol controller is a Fibre Channel controller providing SAN connectivity to the first adapter.

7. The method of claim 1, wherein during a configuration process, an attribute is set for the LUN for designating the first adapter as the primary owner of the logical entity.

8. The method of claim 1, wherein during a configuration process, an attribute is set for the LUN to use the first cache LUN for caching data at the first SSD.

9. A machine implemented method, comprising:
creating a cluster having a plurality of member adapters, each member adapter directly coupled to a computing device via a peripheral bus;
identifying a primary master adapter that arbitrates between other cluster member adapters and a secondary master adapter that takes over a role of the primary master adapter, in case the primary master adapter fails;
providing cluster information to all the member adapters, the cluster information includes a unique cluster identifier, an identifier for identifying each cluster member adapter and a status of each cluster member adapter;
storing the cluster information by each member adapter for enabling authorized communication between the cluster member adapters;
configuring a cache region as part of a logical unit number (LUN) and assigning ownership of the cache region to a member adapter and notifying each cluster member adapter of the cache region owner such that any request to write to the LUN is forwarded to the cache region owner;
a first adapter from among the plurality of member adapters, receiving a request to read data from a storage location represented by the LUN presented to an application executed by a first computing device coupled to the first adapter; wherein the first adapter includes a storage protocol controller operating as a host bus adapter for interfacing with a storage device accessible via a storage area network (SAN) and processing input/output requests for storing information at and reading information from the storage device accessible via the SAN; and the first adapter includes a first solid state storage device (SSD), where storage space of the SSD is configured to operate as a first cache logical unit number (LUN) for storing data; and the first adapter is a part of the cluster having at least a second adapter having a second SSD whose storage space is configured to operate as a second cache LUN; and
the first adapter reading the data from the first cache LUN, when the first adapter is a cache owner of the LUN, otherwise the request is sent to the second adapter that is the cache owner of the LUN and the second adapter obtains data in response to the request.

10. The method of claim 9, wherein storage space at the first SSD and the second SSD is presented as a shared logical entity to the first computing device and a second computing device coupled to the second adapter for storing information.

11. The method of claim 9, wherein the second SSD operates to mirror data stored at the first SSD.

12. The method of claim 9, wherein the LUN is based on storage space at the SAN accessible storage device and the first cache LUN is used to store data at the first SSD and then transfer data to the SAN accessible storage device.

13. The method of claim 9, wherein the LUN is based on storage space at the SAN accessible storage device and the first cache LUN is used to store data at the first SSD and then transfer data to the SAN accessible storage device and also mirror data at the second SSD.

14. The method of claim 9, wherein the storage protocol controller is a Fibre Channel controller providing SAN connectivity to the first adapter.

15. The method of claim 9, wherein during a configuration process, an attribute is set for the LUN for designating the first adapter as the primary owner of the LUN.

16. The method of claim 9, wherein during a configuration process, an attribute is set for the LUN to use the first cache LUN for caching data at the first SSD.

17. A non-transitory, machine readable storage medium having stored thereon instructions for performing a method, comprising machine executable code which when executed by at least one machine, causes the machine to:

create a cluster having a plurality of member adapters, each member adapter directly coupled to a computing device via a peripheral bus;

identify a primary master adapter that arbitrates between other cluster member adapters and a secondary master adapter that takes over a role of the primary master adapter, in case the primary master adapter fails;

provide cluster information to all the member adapters, the cluster information includes a unique cluster identifier, an identifier for identifying each cluster member adapter and a status of each cluster member adapter;

store the cluster information by each member adapter for enabling authorized communication between the cluster member adapters;

configure a cache region as part of a logical unit number (LUN) and assigning ownership of the cache region to a member adapter and notifying each cluster member adapter of the cache region owner such that any request to write to the LUN is forwarded to the cache region owner;

receive a request by a first adapter from among the plurality of member adapters to write data at a storage location represented by the LUN presented to an application executed by a first computing device coupled to the first adapter via a peripheral bus;

wherein the first adapter includes a storage protocol controller operating as a host bus adapter for interfacing with a storage device accessible via a storage area network (SAN) and processing input/output requests for storing information at and reading information from the storage device accessible via the SAN; and the first adapter includes a first solid state storage device (SSD), where storage space of the SSD is configured to operate as a first cache logical unit number (LUN) for storing data; and the first adapter is a part of the cluster having at least a second adapter from among the plurality of member adapters with a second SSD whose storage space is configured to operate as a second cache LUN; and wherein the first adapter writes the data to the first cache LUN at the first SSD, when the first adapter is a cache owner of the LUN presented to the application, otherwise the request is sent to the second adapter that is the cache owner of the LUN presented to the application and the second adapter processes the request to cache data at the second cache LUN at the second SSD.

18. The non-transitory medium of claim 17, wherein storage space at the first SSD and the second SSD is presented as a shared logical entity to the first computing device and a second computing device coupled to the second adapter for storing information.

19. The non-transitory storage medium of claim 17, wherein in response to a read request, the first adapter reads data from the first cache LUN, when the first adapter is a cache owner of the LUN, otherwise the read request is sent to the second adapter that is the cache owner of the LUN and the second adapter obtains data in response to the request.

20. The non-transitory, storage medium of claim 17, wherein the LUN is based on storage space at the SAN accessible storage device and the first cache LUN is used to store data at the first SSD and then transfer data to the SAN accessible storage device and also mirror data at the second SSD.

* * * * *